(12) United States Patent
Talavera

(10) Patent No.: US 10,589,685 B1
(45) Date of Patent: Mar. 17, 2020

(54) PORTABLE EXPANDABLE MIRRORS WITH LIGHTS FOR USE IN MOTOR VEHICLES AND ELSEWHERE

(71) Applicant: Lilly R. Talavera, Richardson, TX (US)

(72) Inventor: Lilly R. Talavera, Richardson, TX (US)

(*) Notice: Subject to any disclaimer, the term of this patent is extended or adjusted under 35 U.S.C. 154(b) by 0 days.

(21) Appl. No.: 16/423,125

(22) Filed: May 27, 2019

Related U.S. Application Data

(60) Provisional application No. 62/836,719, filed on Apr. 22, 2019.

(51) Int. Cl.
| | |
|---|---|
| G02B 7/182 | (2006.01) |
| B60R 1/12 | (2006.01) |
| A45D 42/18 | (2006.01) |
| B60R 11/00 | (2006.01) |

(52) U.S. Cl.
CPC ............ B60R 1/12 (2013.01); A45D 42/18 (2013.01); *B60R 2011/0007* (2013.01); *B60R 2011/0035* (2013.01); *B60R 2011/0082* (2013.01)

(58) Field of Classification Search
CPC .......... B60J 3/0204; B60J 3/0282; B60J 3/02; B60R 1/04; B60R 1/12; B60R 1/1207; B60R 11/00; B60R 2001/1238; B60R 2001/1269; B60R 2001/1284; B60R 2011/0035; B60R 2011/0082; G02B 1/11; G02B 7/1821; G02B 7/182; G60Q 3/02; B60Q 3/258

See application file for complete search history.

(56) References Cited

U.S. PATENT DOCUMENTS

| | | | | |
|---|---|---|---|---|
| 365,183 | A * | 6/1887 | Hufeland | B60R 1/081 359/854 |
| 2,547,101 | A * | 4/1951 | Uttz | B60R 7/05 224/539 |
| 3,145,257 | A * | 8/1964 | Suga | B60R 1/025 359/854 |
| 3,371,955 | A * | 3/1968 | Herrington, Sr. | B60J 3/0208 296/97.8 |
| 3,588,233 | A * | 6/1971 | Lambert | B60J 3/0282 359/844 |
| 4,213,169 | A * | 7/1980 | Kempkers | B60J 3/0282 362/140 |
| 4,624,499 | A * | 11/1986 | Flowerday | B60J 3/0282 296/97.5 |

(Continued)

*Primary Examiner* — William R Alexander
*Assistant Examiner* — Balram T Parbadia

(57) ABSTRACT

Billions of people around the world use a mirror more than once a day. Millions of people own a motor vehicle. The last place we find ourselves prior to many events is in our car. Such events include going on a date, touching up makeup, an important job interview, and other instances where we need to look our best. It is crucial to provide a superior light and mirror experience for facial viewing in these situations. I have created a revolutionary product to help millions around the world succeed by helping them see themselves in better light. More broadly, I have provided solutions, involving combinations of mirrors, light elements, and display screens, for providing users with superior mirror-related experiences in various vanity, medical, travel, and entertainment situations.

30 Claims, 16 Drawing Sheets

(56) References Cited

U.S. PATENT DOCUMENTS

| | | | | |
|---|---|---|---|---|
| 4,681,366 A * | 7/1987 | Lobanoff | ............... | B60N 2/879 |
| | | | | 297/188.06 |
| 5,124,847 A * | 6/1992 | Gong | ..................... | B60R 1/081 |
| | | | | 359/854 |
| 5,206,764 A * | 4/1993 | Lamoglia | ............... | B60J 3/0208 |
| | | | | 296/97.5 |
| 6,585,384 B2 * | 7/2003 | Nielsen | .................. | B60R 1/008 |
| | | | | 359/838 |
| 6,926,416 B2 * | 8/2005 | Sawyer | .................. | B60R 1/081 |
| | | | | 248/467 |
| 7,001,029 B1 * | 2/2006 | Lagana | .................. | B60R 1/081 |
| | | | | 296/97.8 |
| 8,550,531 B1 * | 10/2013 | Fancher, III | ........... | B60J 3/0208 |
| | | | | 296/97.1 |
| 9,421,911 B2 * | 8/2016 | Favila | ..................... | B60R 1/008 |
| 2006/0050018 A1 * | 3/2006 | Hutzel | .................. | B60K 35/00 |
| | | | | 345/60 |
| 2006/0198123 A1 * | 9/2006 | Radu | ..................... | B60J 3/0282 |
| | | | | 362/135 |
| 2017/0322389 A1 * | 11/2017 | Hagestad | ................ | G02B 1/11 |

\* cited by examiner

PORTABLE EXPANDABLE MIRRORS WITH LIGHTS FOR USE IN MOTOR VEHICLES AND ELSEWHERE

CROSS-REFERENCE TO RELATED APPLICATIONS

This application claims the benefit of U.S. Provisional Patent Application No. 62/836,719 filed Apr. 22, 2019, titled "Configurable Mirrors, Light Elements, And Display Screens, Including Combinations Thereof, For Various Vanity, Medical, And Entertainment Applications," which is incorporated by reference herein in its entirety for all purposes.

FIELD

This disclosure is generally related to mirrors.

BACKGROUND

There is a need for a better mirror-related experience in various vanity, medical, and entertainment situations. This disclosure provides solutions for giving users superior mirror-related experiences in many such situations.

SUMMARY

Millions of people around the world use a mirror everyday. Millions of people also use the Internet each day, capture photos, and get ready for work. Millions of people use motor vehicles for instances such as going to work, going on a date, touching up makeup, or going to an important job interview. These are all instances that we need to look our best. The last place we are before these instances is in our cars. It is crucial to provide a superior light and mirror experience while in the motor vehicle. It is also crucial to provide a better light and/or mirror experience in many other situations. Therefore, in some embodiments, an apparatus is provided for use in a motor vehicle. The apparatus comprises: a mirror body, comprising one or more mirror body sections, attachable, using an attachment element, to a portion of a visor or a rearview mirror body of the motor vehicle, wherein the mirror body is associated with an expanded state and a contracted state; and a light element, wherein the light element is activatable or activated when the mirror body or the apparatus is in the expanded state, wherein the light element is not activatable or not activated when the mirror body is in the contracted state, wherein at least some of the one or more mirror body sections at least partially fold onto each other in the contracted state.

In some embodiments, the apparatus further comprises a connector for connecting the apparatus to a power source in the motor vehicle. In some embodiments, the light element is associated with a first mirror body section of the one or more mirror body sections, and a second light element is associated with a second mirror body section of the one or more mirror body sections. In some embodiments, the one or more mirror body sections comprises at least one of a substantially flat mirror body section or a partially concave or convex mirror body section, and wherein the one or more mirror body sections comprises plastic or other soft or hard material. In some embodiments, the apparatus further comprises a switch for activating or deactivating the light element. In some embodiments, the apparatus further comprises a brightness or intensity modifier for modifying the brightness or intensity of the light element. This modifier may be controllable using voice commands, physical input, or a touch-screen input element located on the apparatus. In some embodiments, the apparatus further comprises a lever for expanding or contracting the mirror body, and wherein the lever protrudes from the apparatus. In some embodiments, the lever comprises a hook or a cloth. In some embodiments, the apparatus further comprises a power source for activating the light element, wherein the power source is chargeable using solar energy or is chargeable using a charging connection to an external power source in the motor vehicle. In some embodiments, the apparatus further comprises the attachment element comprises a clip. In some embodiments, the attachment element comprises at least one of a velcro, a suction cup, a spring, or a magnet. In some embodiments, the attachment element comprises at least one of a velcro, a suction cup (or other vacuum suction cups), a spring, or a magnet. In some embodiments, the apparatus or the mirror body or the light element is elliptical, circular, triangular, conical, pentagonal, hexagonal, heptagonal, octagonal, rectangular, or square. In some embodiments, an angular orientation of the apparatus is adjustable after the mirror body is attached, using the attachment element, to the portion of the visor or the rearview mirror body of the motor vehicle. In some embodiments, the a first mirror body section of the one or more mirror body sections is connected to a second mirror body section of the one or more mirror body sections along a lower edge of the first mirror body section and an upper edge of the second mirror body section. In some embodiments, the apparatus as used in this disclosure (also referred to as "herein") may refer to just the mirror body. In other embodiments, the apparatus as used in this disclosure may refer to the mirror body and other elements or features described in this disclosure.

In some embodiments, an apparatus is provided for use in a motor vehicle. The apparatus comprises: a mirror body attachable, using an attachment element, to a portion of a dashboard, a console, an air-conditioning vent, a steering wheel, or a seat headrest of the motor vehicle, wherein the mirror body is associated with an expanded state and a contracted state; and a light element, wherein the light element is activatable or activated when the mirror body is in the expanded state, and wherein the light element is not activatable or not activated when the mirror body is in the contracted state.

In some embodiments, an apparatus is provided for use with a substantially flat surface. The apparatus comprises: a mirror body, comprising one or more mirror body sections, attachable, using an attachment element, to the substantially flat surface, wherein the mirror body is associated with an expanded state and a contracted state; and a light element, wherein the light element is activatable or activated when the mirror body is in the expanded state, wherein the light element is not activatable or not activated when the mirror body is in the contracted state, and wherein at least some of the one or more mirror body sections at least partially fold onto each other in the contracted state. In some embodiments, the attachment element comprises a clip. In some embodiments, the substantially flat surface is associated with a door, and wherein the attachment element comprises an over-the-door clip. In some embodiments, the attachment element comprises a suction cup. In some embodiments, the substantially flat surface comprises a screen of a desktop monitor, and the apparatus is substantially parallel with regard to the screen of the desktop monitor.

In some embodiments, an apparatus is provided for use in a motor vehicle. The apparatus comprises a mirror body, comprising one or more mirror body sections, attachable, using an attachment element, to a portion of a visor or a rearview mirror body of the motor vehicle, wherein the mirror body is associated with an expanded state and a contracted state; and a light element, wherein the light element is activatable or activated when the mirror body is in the expanded state, wherein the light element is activatable or activated when the light element or the apparatus is connected to a power source in the expanded state, wherein at least some of the one or more mirror body sections form a at least partially flat (or continuous or contiguous) surface in the expanded state, wherein at least some of the one or more mirror body sections at least partially fold onto each other in the contracted state.

In some embodiments, an apparatus is provided for use in a motor vehicle. The apparatus comprises: a mirror body, comprising one or more mirror body sections, attachable, using an attachment element, to a portion of a dashboard, a console, an air-conditioning vent, a steering wheel, or a seat headrest of the motor vehicle, wherein the mirror body is associated with an expanded state and a contracted state; and a light element, wherein at least some of the one or more mirror body sections form a at least partially flat surface in the expanded state, wherein the light element is activatable or activated when the light element or the apparatus is connected to a power source, wherein at least some of the one or more mirror body sections at least partially fold onto each other in the contracted state, and wherein the light element is not activatable or not activated when the light element or the apparatus is not connected to the power source.

In some embodiments, an apparatus is provided that comprises: a mirror body, comprising one or more mirror body sections, attachable, using an attachment element, to a object or a visor, wherein the mirror body is associated with an expanded state and a contracted state; a light element; and a power source for providing power to the light element; wherein the light element is activatable or activated, using the power from the power source, when the mirror body is in the expanded state, wherein at least some of the one or more mirror body sections form at least a partially flat surface in the expanded state, wherein at least some of the one or more mirror body sections at least partially fold onto each other in the contracted state.

In some embodiments, an apparatus is provided for use with a surface (e.g., substantial flat surface, curved surface, etc.). The apparatus comprises a mirror body, comprising one or more mirror body sections, attachable, using an attachment element, to the surface, wherein the mirror body is associated with an expanded state and a contracted state; a light element; and a power source, wherein the light element is activatable or activated when the mirror body is in the expanded state, wherein at least some of the one or more mirror body sections form a at least partially flat surface in the expanded state, wherein at least some of the one or more mirror body sections at least partially fold onto each other in the contracted state. As used herein, foldable, contractable, or retractable may be used interchangeably. The foldable, retractable, or contractable state is used for efficiently transporting or carrying the mirror in a handbag, pursue, shirt or trouser pocket, bag pocket, mirror or small item pouch, etc. In some embodiments, one or more of the mirror sections may be curved or bendable. In some embodiments, one or more of the mirror sections may comprise a display screen.

In some embodiments, an apparatus is provided comprising: a mirror body, comprising one or more mirror body sections, attachable, using a first attachment element, to a portion of a visor in a motor vehicle, wherein the mirror body is associated with an expanded state and a contracted state, wherein the one or more mirror body sections comprises a first mirror body section and a second mirror body section, wherein the first mirror body section, comprising a first reflective surface, is connected, using a second attachment element, to the second mirror body section comprising a second reflective surface, wherein the first attachment element is different from the second attachment element; a light element comprised in or on the second mirror body section; and a connector; wherein, in the expanded state, the first mirror body section and the second mirror body section form a third reflective surface comprising the first reflective surface and the second reflective surface, wherein continuity of the third reflective surface is broken along an edge of the first mirror body section or the second mirror body section, wherein a first area of the third reflective surface is greater than a second area of the first reflective surface or the second reflective surface, and wherein the mirror body, in the expanded state, is positionable, using the first attachment element, wherein when the mirror body is attached, using the first attachment element, to the portion of the visor in the motor vehicle, the first mirror body section and the second mirror body section do not rest on a surface of the portion of the visor, wherein, in the contracted state, the first mirror body section folds onto the second mirror body section such that the first reflective surface is both facing the second reflective surface and not in physical contact with the second reflective surface, and such that, in the contracted state, the light element, comprised in or on the second mirror body section is not in physical contact with the first reflective surface, wherein a length of at least one first edge of the mirror body in the expanded state is substantially equivalent to the length of the at least one first edge of the mirror body in the contracted state, and wherein the light element is activatable or activated when the light element or the mirror body is connected, via the connector, to a power source.

In some embodiments, the apparatus further comprises an element for retaining the apparatus (e.g., the mirror body) in the contracted state such that a minor force applied to the apparatus (e.g., the mirror body) does not cause the apparatus to enter the expanded state. In some embodiments, the element comprises a magnet. In some embodiments, the apparatus further comprises a cover for the light element, and wherein the first reflective surface, the second reflective surface, and the cover for the light element either form the third reflective surface in the expanded state, wherein the third reflective surface is substantially flat, or are at a substantially similar surface level. In some embodiments, the apparatus further comprises a cover for the light element, wherein a protrusion of a surface of the cover for the light element (e.g., from the surface of the apparatus in the expanded state) is less than or equal to one inch. In some embodiments, the apparatus further comprises a second light element comprised in or on the first mirror body section. In some embodiments, the apparatus further comprises the light element is comprised in or on the second reflective surface. In some embodiments, the light element is comprised in the second mirror body section outside the second reflective mirror surface. In some embodiments, the apparatus further comprises a switch for activating or deactivating the light element. In some embodiments, the apparatus further comprises a brightness or intensity or color modifier for modifying the brightness or intensity or color of the light element, respectively. In some embodiments, the apparatus further comprises a lever for expanding or contracting the mirror body, and wherein the lever protrudes from the apparatus. In some embodiments, the apparatus further comprises a power source for providing power for activating the light element. In some embodiments, the attachment element comprises a clip or a clasp. In some embodiments, the attachment element does not wrap around a body of the visor. In some embodiments, the portion of the visor comprises an edge (e.g., a single edge or only a single edge) of the visor. In some embodiments, the edge of the visor comprises a bottom horizontal edge of the visor. In some embodiments, the mirror body is attached, using the first attachment element, to the portion of the visor in the motor vehicle, the first mirror body section and the second mirror body section are not in physical contact with the portion of the visor. In some embodiments, an angular orientation of the apparatus (e.g., the first mirror body section, the second mirror body section, the light element, etc.) is adjustable after the mirror body is attached, using the attachment element, to the portion of the visor in the motor vehicle. In some embodiments, an angular orientation of the apparatus is not adjustable after the mirror body is attached, using the attachment element, to the portion of the visor in the motor vehicle. In some embodiments, the light element is not activatable or not activated when the mirror body is in the contracted state.

In some embodiments, an apparatus is provided comprising: a mirror body, comprising one or more mirror body sections, attachable, using a first attachment element, to a first interior portion of a motor vehicle or a second interior portion of the motor vehicle, wherein the second interior portion of the motor vehicle comprises a visor in the motor vehicle, wherein the mirror body is associated with an expanded state and a contracted state, wherein the one or more mirror body sections comprises a first mirror body section and a second mirror body section, wherein the first mirror body section, comprising a first reflective surface, is connected, using a second attachment element, to the second mirror body section comprising a second reflective surface, wherein the first attachment element is different from the second attachment element; and a light element comprised in or on the second mirror body section; a connector; wherein, in the expanded state, the first mirror body section and the second mirror body section form a third reflective surface comprising the first reflective surface and the second reflective surface, wherein continuity of the third reflective surface is broken along an edge of the first mirror body section or the second mirror body section, wherein a first area of the third reflective surface is greater than a second area of the first reflective surface or the second reflective surface, wherein when the mirror body is attached, using the first attachment element, to the first interior portion of a motor vehicle or the second interior portion of the motor vehicle, the first mirror body section and the second mirror body section do not rest on a surface of either the first interior portion of a motor vehicle or the second interior portion of the motor vehicle, wherein, in the contracted state, the first mirror body section folds onto the second mirror body section such that the first reflective surface is both facing the second reflective surface and not in physical contact with the second reflective surface, and such that, in the contracted state, the light element, comprised in or on the second mirror body section is not in physical contact with the first reflective surface, wherein the light element is activatable or activated when the light element or the apparatus is connected, via the connector, to a power source, and wherein the light element is not activatable or not activated when the light element or the apparatus is not connected, via the connector, to the power source. In some embodiments, when the mirror body is attached, using the first attachment element, to the first interior portion of a motor vehicle or the second interior portion of the motor vehicle, the first mirror body section and the second mirror body section does not rest on a surface of either the first interior portion of a motor vehicle or the second interior portion of the motor vehicle.

In some embodiments, the attachment element comprises at least one of a suction cup, a spring, or a magnet. In some embodiments, the apparatus further comprises a retaining element for retaining the apparatus in the contracted state or for preventing the mirror body from entering the expanded state in response to a minor application of pressure or force on the apparatus. In some embodiments, the apparatus further comprises a manual, mechanical, or electronic initiation element for enabling the mirror body to be placed in the expanded state or the contracted state. In some embodiments, when the mirror body is attached, using the first attachment element, to the first interior portion of a motor vehicle or the second interior portion of the motor vehicle, the first mirror body section and the second mirror body section are not in physical contact with either the first interior portion of a motor vehicle or the second interior portion of the motor vehicle. In some embodiments, an angular orientation of the apparatus (e.g., the first mirror body section, the second mirror body section, the light element, etc.) is adjustable after the mirror body is attached, using the attachment element, to the first interior portion of a motor vehicle or the second interior portion of the motor vehicle. In some embodiments, the first interior portion of the motor vehicle comprises at least one of a dashboard, a central console, a rearview mirror body, or a headboard of the motor vehicle.

In some embodiments, an apparatus is provided comprising: a mirror body, comprising one or more mirror body sections, attachable, using a first attachment element, to a visor or to an object, wherein the mirror body is associated with an expanded state and a contracted state, wherein the one or more mirror body sections comprises a first mirror body section and a second mirror body section, wherein the first mirror body section, comprising a first reflective surface, is connected, using a second attachment element, to the second mirror body section comprising a second reflective surface, wherein the first attachment element is different from the second attachment element; a light element comprised in or on the second mirror body section; and a connector; wherein, in the expanded state, the first mirror body section and the second mirror body section form a third reflective surface comprising the first reflective surface and the second reflective surface, wherein continuity of the third reflective surface is broken along an edge of the first mirror body section or the second mirror body section, wherein a first area of the third reflective surface is greater than a second area of the first reflective surface or the second reflective surface, wherein, in the contracted state, the first mirror body section folds onto the second mirror body section such that the first reflective surface is both facing the second reflective surface and not in physical contact with the second reflective surface, and such that, in the contracted state, the light element, comprised in or on the second mirror body section is not in physical contact with the first reflective surface, wherein the light element is activatable or activated when the light element or the apparatus is connected, via the connector, to a power source, and wherein the light element is not activatable or not activated when the light element or the apparatus is not connected, via the connector, to the power source.

In some embodiments, the attachment element comprises a clip or a clasp. In some embodiments, the attachment element comprises a suction cup. In some embodiments, the object comprises a substantially flat surface, and wherein an angular orientation of the first reflective surface or the second reflective surface is adjustable with respect to the substantially flat surface. In some embodiments, in the expanded state, a gap between the first mirror body section or the second mirror body section and the portion of the visor is at least greater than 0.25 inches. In some embodiments, when the mirror body is attached, using the first attachment element, to the object or the visor, a gap between the first mirror body section or the second mirror body section and the visor or the object is at least greater than 0.25 inches. In some embodiments, the mirror body, in the expanded state, is positionable, using the first attachment element, without being supported by an external surface located substantially perpendicular to and under the first reflective surface or the second reflective surface. In some embodiments, an angular orientation of the apparatus (e.g., the first mirror body section, the second mirror body section, or the light element) is adjustable after the mirror body is attached, using the attachment element, to the visor or to the object. In some embodiments, a length of an edge of the mirror body is less than or equal to twenty inches when the mirror body is in the contracted state. In some embodiments, the apparatus further comprises at least one compartment, ridge, pocket, or platform for placing or securing a video camera or a mobile communication device. In some embodiments, the apparatus further comprises at least one compartment, ridge, pocket, or platform for placing or securing a cosmetic or makeup item. In some embodiments, the apparatus an aperture. In some embodiments, the apparatus further comprises a computing device and a display screen.

DETAILED DESCRIPTION

Billions of people around the world use a mirror more than once a day. Millions of people own a motor vehicle. In some embodiments, this disclosure provides a combination of both. It is crucial to provide a better light and mirror experience for facial viewing while in a vehicle by a providing a superior light and mirror experience in instances such as going to work, going on a date, touching up makeup, or an important job interview. These are all instances that we need to look our best. The last place you are before these instances is in your car. I have created a revolutionary product to help millions around the world succeed by helping them see themselves in better light. This disclosure provides solutions, involving combinations of mirrors, light elements, and display screens, for giving users superior mirror-related experiences in various vanity, medical, and entertainment situations.

Figure 1A:
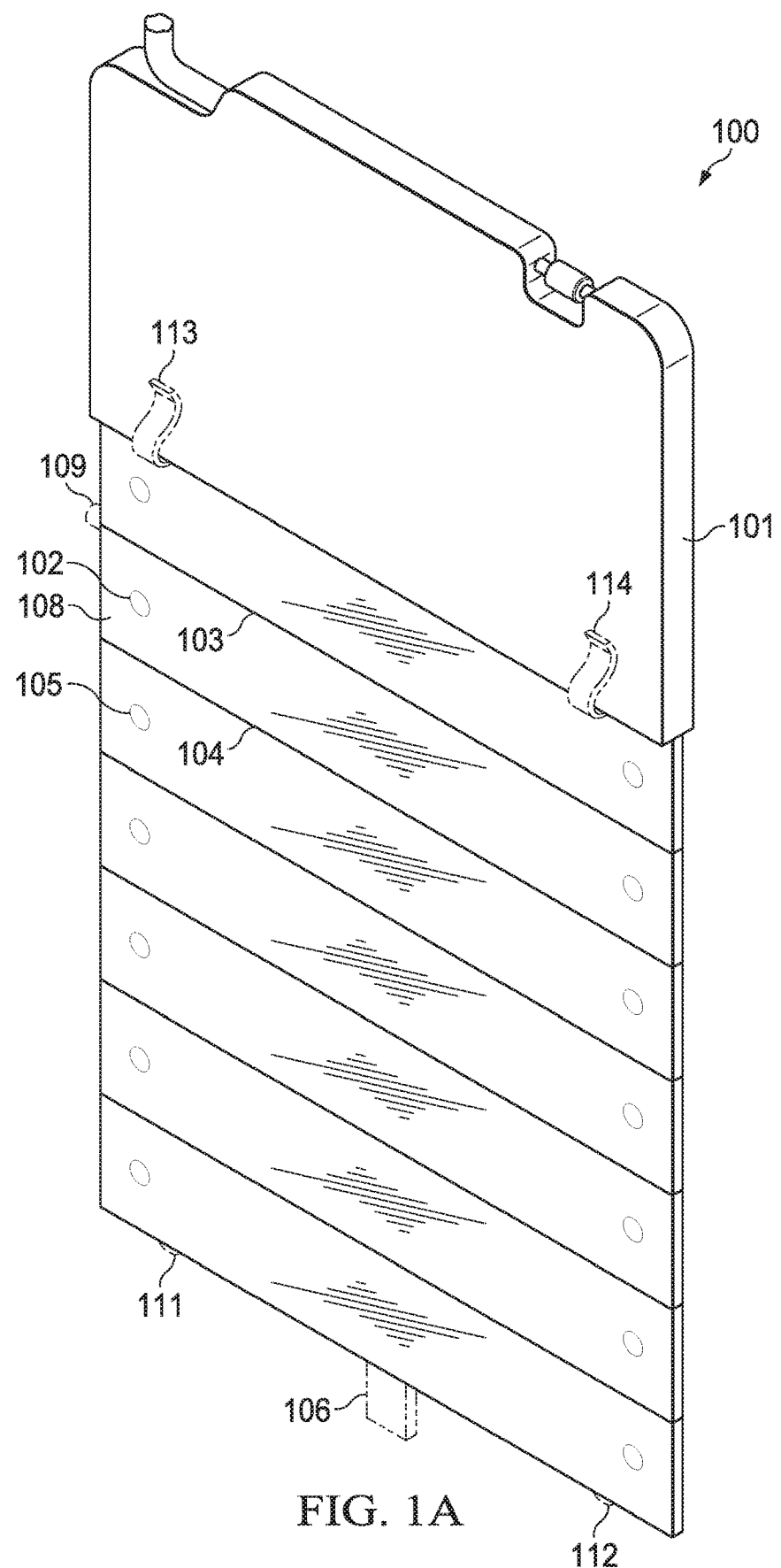
FIG. 1A is a perspective view of an exemplary mirror apparatus, in accordance with some embodiments of this disclosure.
Figure 1B:
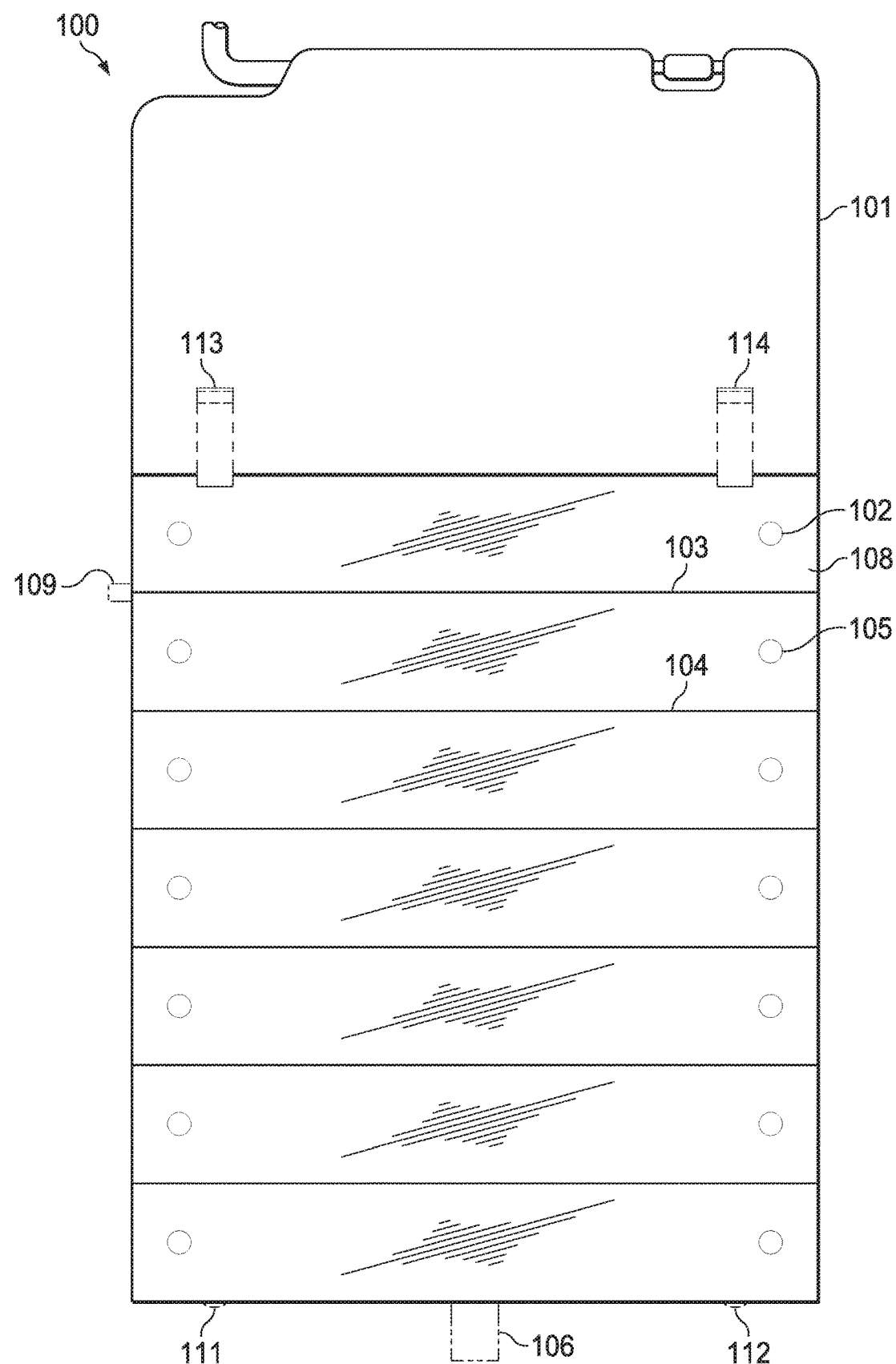
FIG. 1B is a front view of an exemplary mirror apparatus, in accordance with some embodiments of this disclosure.
Figure 1C:
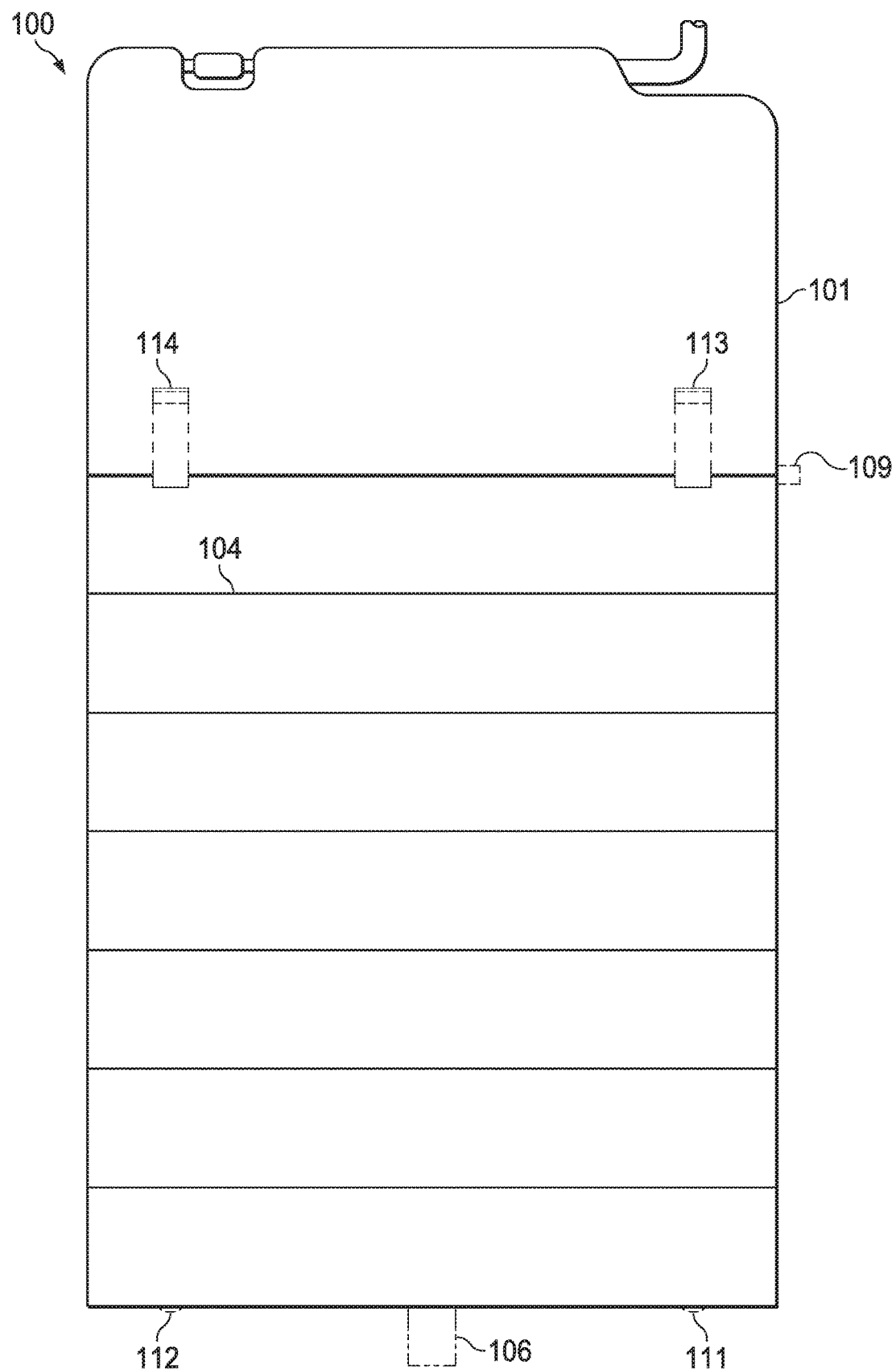
FIG. 1C is a back view of an exemplary mirror apparatus, in accordance with some embodiments of this disclosure.
Figure 1D:
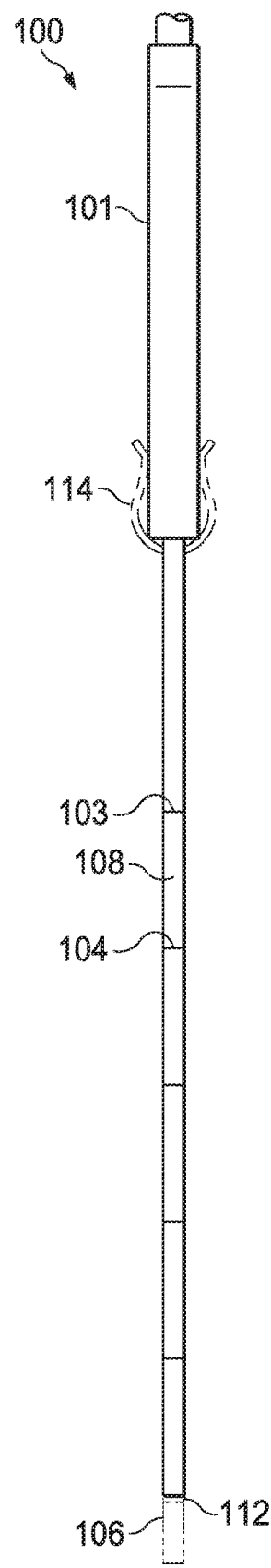
FIG. 1D is a right view of an exemplary mirror apparatus, in accordance with some embodiments of this disclosure.
Figure 1E:
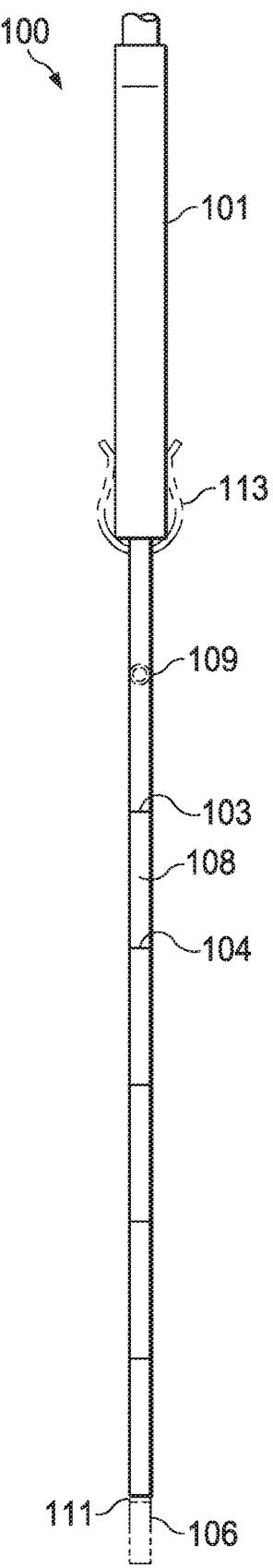
FIG. 1E is a left view of an exemplary mirror apparatus, in accordance with some embodiments of this disclosure.
Figure 1F:
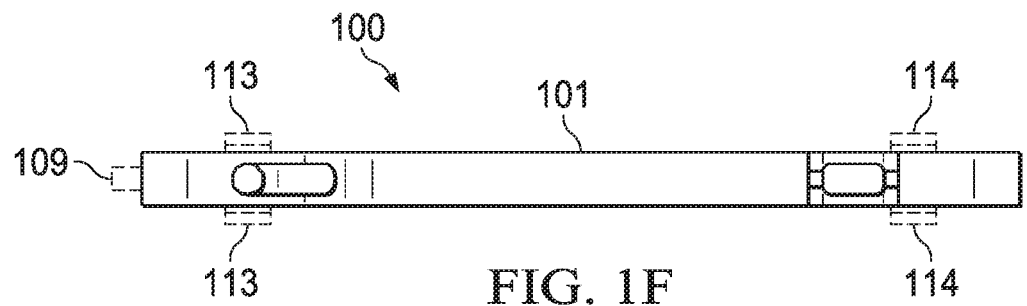
FIG. 1F is a top view of an exemplary mirror apparatus, in accordance with some embodiments of this disclosure.
Figure 1G:
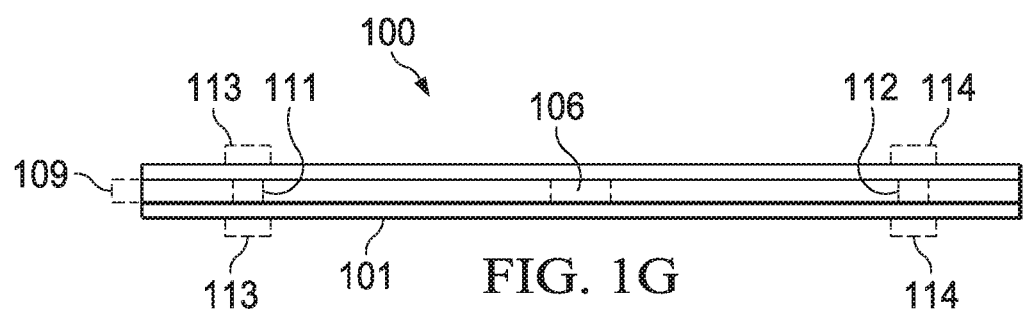
FIG. 1G is a bottom view of an exemplary mirror apparatus, in accordance with some embodiments of this disclosure.

FIG. 1A is a perspective view of the apparatus 100, according to some embodiments of the disclosure. FIGS. 1B-1G are the front, back, right, left, top, and bottom views, respectively, of the apparatus 100, in accordance with some embodiments of the disclosure. Apparatus 100 may include body attachment element that attaches the apparatus to at least one of the visor (e.g., a sun visor or any other visor), rear-view mirror, console, steering wheel, air-conditioning vent, seat headboard, interior roof, etc., or any other interior portion(s) (or exterior) of motor vehicle. The apparatus may comprise body 108 (or mirror body), body attachment element 101 (or just attachment, or body attachment element, etc.), lever 106, power source connector 109, mirror body section 103 (or just body section), light element 102, mirror body section 104, light element 105, a closing element mechanism 111, 112, 113, 114, etc. The apparatus may not be limited to the elements described in this disclosure. The apparatus may be comparable, or larger, or smaller in size (e.g., height, weight, and/or depth) and/or shape to a visor mirror, a rearview mirror, or may be larger and comparable, or larger, or smaller in size (e.g., height, weight, and/or depth) to a vehicle dashboard, console, seat headrest etc. The apparatus may be portable such that it may be easily carried in wallet, purse, bag, pocket, etc. In some embodiments, the mirror may expand and contract like an accordion. The quality of the mirror image is not affected by the various sections that line up to form the mirror body. In some embodiments, a visor described herein may be attached to a roof and/or near a top portion of windshield of a motor vehicle. In some embodiments, any of the elements described herein may be optional (i.e., not provided in or external to the apparatus). In some embodiments, the weight of the apparatus is less than one pound, two pounds, three pounds, four pounds, etc.

Body attachment element 101 may be connected to any edge, surface (e.g., top, bottom, side, upper, lower, front, back, etc.), or corner/vertex of the apparatus, or any combination thereof. Body attachment element may rotate, may be expandable and contractable/foldable/shrinkable/retractable, and/or may spin on any horizontal, vertical, or diagonal axis relative to the body attachment, the apparatus, or any surface or element of any interior portion (e.g., such as those described herein) or exterior portion of the motor vehicle, while still being attached to the body. Body attachment element may enable the body to at least partially rotate about any horizontal, vertical, or diagonal axis with regard to the body, the body attachment element, any other element of the apparatus, or any surface of any of interior or exterior portion(s) of the motor vehicle, including, but not limited to, those portions described in this disclosure. Body attachment element may be made of plastic, metal (e.g., iron), leather, or any other material or combination thereof. The color and/or material of the body attachment element may substantially match the color and/or material of the interior or exterior portion of the vehicle attached to the body attachment element. In some embodiments, the apparatus may contract or expand either after, before, or while attaching the apparatus to an interior or exterior portion of the motor vehicle. In some embodiments, the apparatus may contract or expand automatically upon attachment of the apparatus to the interior or exterior portion of the motor vehicle. In other embodiments, the apparatus may contract or expand after an action associated with the apparatus is performed (e.g., by a human user). For example, a user may use a lever to pull down (or up) the body to overcome an attractive force between magnets associated with the apparatus that are used to keep the apparatus in its contracted state. Multiple body attachment elements may be provided. The types of attachment elements are not limited to those described herein. Body attachment element include at least one of clip(s), suction cup(s) or pad(s), magnet(s), velcro, spring element(s), hinge element(s), strap(s), cloth(s), knot(s), button(s), stick-on(s), pin(s), screw(s), wire(s), cable(s), fastener(s), clip(s), button(s), clasp(s), clamp(s), hinge(s), latch(es), hook(s), belt(s), buckle(s), rope(s), string(s), etc. The attachment elements may attach at least one of the back, front, left side, right side, top, or bottom portion of the apparatus to at least one of the back, front, left side, right side, top, or bottom portion of the visor or any other object or surface to which the apparatus is to be attached.

Mirror body 108 may comprise one or more sections 103, 104. The one or more sections may fold onto each other in the contracted state. The one or more sections may be connected edge-to-edge (e.g., along one or more points, along a substantial portion of the edge(s), along an entire portion of the edge(s), etc.) in the contracted and/or expanded states. An edge may be associated with any surface of each of the sections, e.g., top, bottom, side, upper, lower, etc. The one or more sections may be connected to each other or to any exterior surface or edge (e.g., associated with a vehicle) using any attachment mechanism or element described herein, e.g., clip(s), suction cup(s) or pad(s), magnet(s), velcro, spring element(s), hinge element(s), strap(s), cloth(s), knot(s), button(s), stick-on(s), pin(s), screw(s), wire(s), cable(s), fastener(s), clip(s), buckle(s), clasp(s), clamp(s), hinge(s), latch(es), hook(s), belt(s), button(s), rope(s), string(s), etc. The mirror body may comprise a mirror, plastic (or an other material such as cloth, paper or other rollable or foldable material, etc.) base, a light element, etc. The various sections may be of similar or different dimensions (e.g., height, width, depth, shape, etc.). In some embodiments, the mirror body may be a mirror body with a single mirror section. In some embodiments, each section may include its own light element. The light element may either be located on the surface of the mirror or on a plastic base (or other material) surface outside the edge of the mirror. In some embodiments, the one or more sections may be detachable from the apparatus such that sections may be attached to the apparatus, sections may be removed from the apparatus, etc. In some embodiments, the one or more sections, in an expanded state, provide a substantially clear mirror image such that the breaks between the one ore more sections are not substantially noticeable. In some embodiments, the apparatus described herein may be referred to as a slinky mirror as it may a spring-like expansion from the contracted state to the expanded state. In some embodiments, the apparatus described herein may be referred to as a vanity mirror. In some embodiments, the apparatus described herein may spin (e.g., counterclockwise, clockwise, etc.), tilt, or be angled about any axis of the mirror (e.g., horizontal, vertical, diagonal, etc.), lever, mandrel, etc.

In some embodiments, the attachment mechanism between the one or more sections may be adjustable (e.g., adjusting the angular orientation between the one or more sections) such that the one or more sections are substantially flat with respect to each other in the expanded state.

In some embodiments, a top edge of a lower section is connected to a bottom edge of an upper section. In an embodiment with at least three mirror sections (e.g., lower, middle, upper), the upper section may fold on top of (or below) the middle section (e.g., along a common edge between the upper section and the middle section), and the lower section may fold under (or on top of) the middle section (e.g., along a common edge between the lower section and the middle section. The lower or upper section may function as the middle section with respect to other groups of three sections. In the contracted state, the one or more sections are substantially stacked on each other such that the apparatus can be stored in a purse, handbag, etc., and is easily portable. In other embodiments, a top edge of a lower section is connected to a top edge of an upper section, and the one or more sections are still substantially stackable on each other.

In some embodiments, one or more of the sections may comprise just a light element and/or just a base portion (and no mirror portion). In some embodiments, a light element may be comprised on the uppermost section (which may or may not comprise a mirror portion). In some embodiments, a light element may, additionally or alternatively, be comprised on the lowermost section (which may or may not comprise a mirror portion). In some embodiments, the surface around the mirror portion in the apparatus may be manufactured with or covered with cloth, leather, or some other soft material. In some embodiments, this surface may be detachable replaceable periodically by the user. In some embodiments, the base portion may be manufactured with cloth, leather soft material, firm material, or any combination thereof. In some embodiments, the one or more mirror sections and the base section may be detachable such that that the apparatus can be made longer or shorter to suit the needs or desires of the user.

In some embodiments, the apparatus may contract and/or expand substantially vertically with respect to the ground. In other embodiments, the apparatus may contract and/or expand substantially horizontally with respect to the ground. In some embodiments, the number of mirror sections may be one, two, three, four, five, six, seven, eight, nine, ten, or any higher number. In some embodiments, a width (e.g., horizontal) of a mirror section is greater or substantially greater (e.g., at least two times longer, at least three times longer, at least four times longer, etc.) than a height (e.g., vertical) of the mirror section. In other embodiments, a height of a mirror section is greater or substantially greater (e.g., at least two times longer, at least three times longer, at least four times longer, etc.) than a width of the mirror section.

In some embodiments, the mirror body or body section may be a two sided mirror body or body section such that there are reflective surfaces (i.e., mirrors) that can be used in both the expanded and contracted states. In such embodiments, smaller mirror(s) (e.g., the outer surfaces of the mirror body sections) can be used in the contracted state and a larger mirror (comprising a surface formed by at least some of the mirror body sections). In some embodiments, any mirror body section described herein may be a magnifying mirror body section such that a reflective image visible in the mirror body section is a magnified image. In some embodiments, the outer surface of the mirror body section (i.e., the smaller mirror) may covered using cover. The cover may slide in one direction to expose the outer surface, and in another direction to conceal the outer surface. In some embodiments, a pocket or pouch may be provided to store the apparatus. In some embodiments, the pocket or pouch may be manufactured with material such that when the apparatus is located in the pocket or pouch and is placed on a charger, the mirror's internal power source (and/or light elements) may charge.

In some embodiments, a first mirror body section may be connected to, e.g., via an attachment element, a second mirror body section along at least a point or an edge of the first mirror body section or the second mirror body section. In some embodiments, the attachment element may include rope, metal, a spring, accordion-like metallic string, slinky material, or any other attachment element described herein. The attachment element may enable the first mirror body section and the second mirror body section to provide reflective images at different angles. The attachment element may enable the first mirror body section or the second mirror body section to be positioned at acute, obtuse, or substantially perpendicular angular orientations with respect to other mirror body sections such as a base mirror body section. For example, the first mirror body section may provide a reflective image of the right side of a user, and the second mirror body section may provide a reflective image of the left side of the user. As a further example, the first mirror body section may provide a reflective image of the front of a user, and the second mirror body section may provide a reflective image of the back of the user. In the contracted state, the first mirror body section and the second mirror body section may be held together and be stackable. In the expanded state, there may be space between the first mirror body section and the second mirror body section while they are connected as described herein. In some embodiments, the first mirror body section may be rotatable with respect to the second mirror body section. In some embodiments, any of the mirror body sections described herein may not comprise light elements.

In some embodiments, the mirror portion (e.g., the reflective surface) of the mirror body section is flat or sunken such that the outer edges (e.g., protruding or raised outer edges) of the mirror body section surrounding the mirror portion is covered with one or more other material or elements (e.g., plastic, cloth, leather, light element(s), etc.). In embodiments where the mirror portion is surrounded by a light element(s) (e.g., several light elements or a singular light element surrounding the mirror portion, or a light element along each edge, etc.), the light element(s) may be surround by other material or elements described herein (e.g., plastic, cloth, leather, additional light element(s), additional mirror portion, etc.).

In some embodiments, a rail and/or wheels may be provided along which multiple mirror body sections may be stacked, folded, or may slide.

The light element 102, 105 may be solar-powered light, battery-powered light, car power source-powered light. The light element may include one more LED lights (e.g., clear, no filter, etc.) or any other type of lights. The light element may refer to the light element along with any other elements (e.g., a cover for the light element which may be glass, plastic, or any other material). This disclosure is not limited to any particular light technology. One or more light elements may be included in each body section. Each light element may include one or more light elements. In some embodiments, a light element may be provided along one or more edges (e.g., one or more contiguous or non-contiguous points) of the apparatus (e.g., at least one of top, bottom, upper, lower, back, front, etc.). The light element may be located on any face of the apparatus, including top, bottom, upper, lower, back, front, etc. In some embodiments, the light element may be provided on the same (e.g., front) or different (e.g., side) surface of the apparatus from that of the mirror body (or the one or more mirror sections). The light element may be of color, including, white, soft white, red, orange, yellow (or bright undertones), green, blue (or cool undertones), orange, etc. The light color/brightness/intensity may be adjustable using an adjustment element provided on the apparatus. In some embodiments, the adjustment element may be controlled using a command such as a voice command, a command from a remote control device such as a mobile phone, etc. There may be various fixed levels associated with the adjustable color/brightness/intensity or a continuum of levels may be provided (e.g., using a manual or virtual dial-type input). The light elements may be located (e.g., on a front surface) along four edges of the front surface of the mirror body or a particular mirror section. In some embodiments, the apparatus 100 may or may not include a light element as described in this disclosure. In such embodiments, a light element may be provided separate from the apparatus. In some embodiments, the light element may be embedded into the apparatus (or mirror body) such that the surface of the light element (or a cover covering the light element) is substantially flat (e.g., does not protrude) and substantially adjacent to (or substantially aligns with) the surface of the one or ore mirror sections (e.g., substantially flat) in the mirror body. In other embodiments, the light element (or a cover covering the light element) may protrude (e.g., slightly, less than or equal to 0.5 inches, less than or equal to one inch, less than or equal to 1.5 inches, less than or equal to 2 inches, etc.) out of the surface of the one or more mirror sections (e.g., substantially flat) in the mirror body. In some embodiments, the surface of the protruding cover may be curved, while in other embodiments, the surface of the protruding cover may be flat. In embodiments where the protruding cover has a flat surface, the one or more sections may rest flat on the one or more protruding covers covering the one or more light elements. The three-dimensional shape of the cover may be a dome, a cone, a cube, cuboid, rectangular cuboid, etc. The three-dimensional cover may have reflective surface (either internally or externally) to enhance the intensity or brightness of light being transmitted through the cover. In some embodiments, the light element may illuminate the front and/or back surface of the mirror body. In some embodiments, the light element may illuminate the border or circumference of the mirror body. In some embodiments, the light element may be a vanity light, high intensity/brightness light, etc. In some embodiments, the light element may be optional (i.e., no light element is provided in the apparatus). In some embodiments, the light element may, additionally or alternatively, comprise a light reflector (e.g., a surface (and optionally a cover) that reflects light) that is not powered by a power source. In some embodiments, the light elements or light element covers may fold onto each other in the contracted state. In some embodiments, the light element may be provided in the mirror body such that the light element is surrounded on all sides by the mirror body; alternatively or additionally, the light element may provided along an edge of the mirror body such that the light element is not surrounded by the mirror body on at least a portion of the edge of the light element. In some embodiments, the cover of the light element may be of a particular shape, structure, or other construction that enables the light cover to influence the color or brightness of the light emerging from the light element being covered by the light element's cover. In some embodiments, the light element surface or light element cover surface may cover substantially an entire surface of one of the mirror body sections connected to a base section or to another mirror body section. In some embodiments, a remote control device may be provided that sends commands (e.g., via short-range communication mechanism) to the mirror apparatus and/or any other apparatuses described in this disclosure for performing any of the functions or operations described in this disclosure.

In some embodiments, the light element (or any other elements associated with the light element, e.g., a light cover) may be expandable or contractable, and may include one or more sections to expand or contract similar to the mirror body. Any features described with respect to any element described herein (e.g., the mirror body) may be applicable with respect to any other element described herein (e.g., light element). In some embodiment, an expandable or contractable light element may be attached (e.g., according to embodiments described herein) to a mirror body that is either fixed in size (e.g., height, width, length, etc.) or is expandable or contractable. In some embodiments, the light element or any associated component of the light component (e.g., a light cover) may be of any shape, including those described herein. In some embodiments, apparatus may include both a compartment for an internal battery (e.g., non-rechargeable, rechargeable, etc. when the apparatus is connected to an external power source) to power the light element and a connection to an external power source. When the apparatus is connected to external power source, the power from the external power source may be used to power the light element. Alternatively, in some embodiments, even when the apparatus is connected to an external power source, the internal battery is used to power the light element and the power from the external power source is used to the charge the internal battery which is rechargeable. In some embodiments, the battery is chargeable using a connection (e.g., USB connection or other) to an electronic device such as mobile phone, laptop, tablet, speakers, headgear, earphone, headphones, desktop, etc. In some embodiments, a power source charging apparatus may be provided internal or external to the apparatus, wherein the power source charging apparatus may be used to charge at least one of the light element, the power source that is used to power the light element, etc. In some embodiments, the light element or the mirror body may be located in a compartment behind the mirror body or the light element, respectively. The light element or the mirror body may be lifted out of the compartment in the expanded state. In some embodiments, the light element (or the mirror body) is located behind the mirror body (or the light element) such that the back surface of the mirror body (or the light element) covers an entire surface area of the light element (of the mirror body). In such embodiments, the light element (or the mirror body) may appear to be hidden. In such embodiments, the light element may be connected to the mirror body along at least a point or an edge of the mirror body or the light element. In such embodiments, the light element (or the mirror body) may be pulled out from behind the mirror body (or the light element). The light element (or the mirror body) may be configured such that its position (e.g., angular orientation, height, etc.) can be configured with respect to the position of the mirror body (or the light element). In some embodiments, the light element is foldable onto the mirror body (e.g., having one or more mirror sections), either under the mirror body or over the mirror body along an edge of the light element or the mirror body. The light element may be substantially parallel to and be in contact with the mirror body (e.g., an edge of the mirror body) in the contracted state. In some embodiments, the surface covers (e.g., protruding surface covers) of one or more light elements on a base section may be substantially parallel to and be in contact with the mirror body (e.g., an edge of the mirror body).

In some embodiments, the light element (e.g., multiple light elements or a single latitudinal light element) is located along a top and/or bottom side of the apparatus, and no light elements (e.g., multiple light elements or a single longitudinal light element) is located along a left and/or right side of the apparatus. In some embodiments, the light element (e.g., multiple light elements or a single longitudinal light element) is located along a left and/or right side of the apparatus, and no light elements (e.g., multiple light elements or a single latitudinal light element) is located along a top and/or bottom side of the apparatus. In some embodiments, multiple light elements or single light element may be located in a diagonal configured on the apparatus.

A lever 106 may be used to expand (e.g., into the expandable state) and contract/contract the apparatus (e.g., into the contracted state). The lever may protrude out of a surface (e.g., bottom, top, left, right, upper, lower, etc.) of the apparatus. The lever may be a hook. Alternatively or additionally, the lever may be manufactured out of cloth (e.g. polyester), plastic, or any other material, including but not limited to those described herein. In some embodiments, multiple levers may be provided. In some embodiments, no levers are provided. Alternatively or additionally, any levers may be located on one or more edges and/or corners of the apparatus. In some embodiments, the lever may be part of the closing mechanism. In such embodiments, any features described with respect to the closing mechanism may be applicable to the lever, and vice versa. In some embodiments, the lever may function as a body attachment element. In such embodiments, any features described with respect to the body attachment element may be applicable to the lever, and vice versa.

The apparatus may include closing element(s) 111, 112, 113, 114 for closing the apparatus such that the apparatus can remain in a contracted state and may be portable. The closing element(s) may include one or more magnets attached to one or more surfaces (top, bottom, side, upper, lower, front, back, etc.) of the apparatus. The closing element(s) may be located on any surface of the apparatus, including top, bottom, side, front, back, lower, upper, etc. Alternatively or additionally, any closing element(s) may be located on one or more edges and/or corners of the apparatus. The number of closing element(s) may vary from one to many. In some embodiments, the lever may, additionally or alternatively, function as the closing element(s) and/or the body attachment, or vice versa. In some embodiments, a closing mechanism is not provided. In some embodiments, the closing element(s) is located (e.g., on one or more surfaces described herein) near a substantially central vertical axis of the apparatus. In some embodiments, the light element may be automatically activated when the apparatus is in a fully expanded state (e.g., all sections are substantially laid out adjacent to each other forming a substantially flat surface) or partially expanded state (e.g., at least some, but not all, sections are laid out adjacent to each other forming a substantially flat surface). In some embodiments, the light element may be automatically deactivated when the apparatus is in a fully contracted state (e.g., all sections are substantially stacked onto each other) or partially contracted state (e.g., at least some, but not all, sections are stacked onto each other).

The apparatus may comprise a power source connector 109. The power source connector may connect to a power source located in the vehicle (i.e., external to the apparatus such as the cigarette lighter receptacle, external battery that can be connected to via a USB cable) or located in the apparatus. The connection to the power source enables activation of the light element in the apparatus. In some embodiments, the power source (e.g., in the apparatus) may be rechargeable such that the power source is recharged using solar energy (e.g., by exposure of the apparatus to the sun) or using a connection to an external power source (e.g., the cigarette lighter receptacle) in the motor vehicle. The power source connector may be a USB connector, mini-USB connector, USB-based connector, or any other power connector. If the power source is an external or internal battery, the battery must have at least some amount of energy to supply to the light element.

Figure 2:
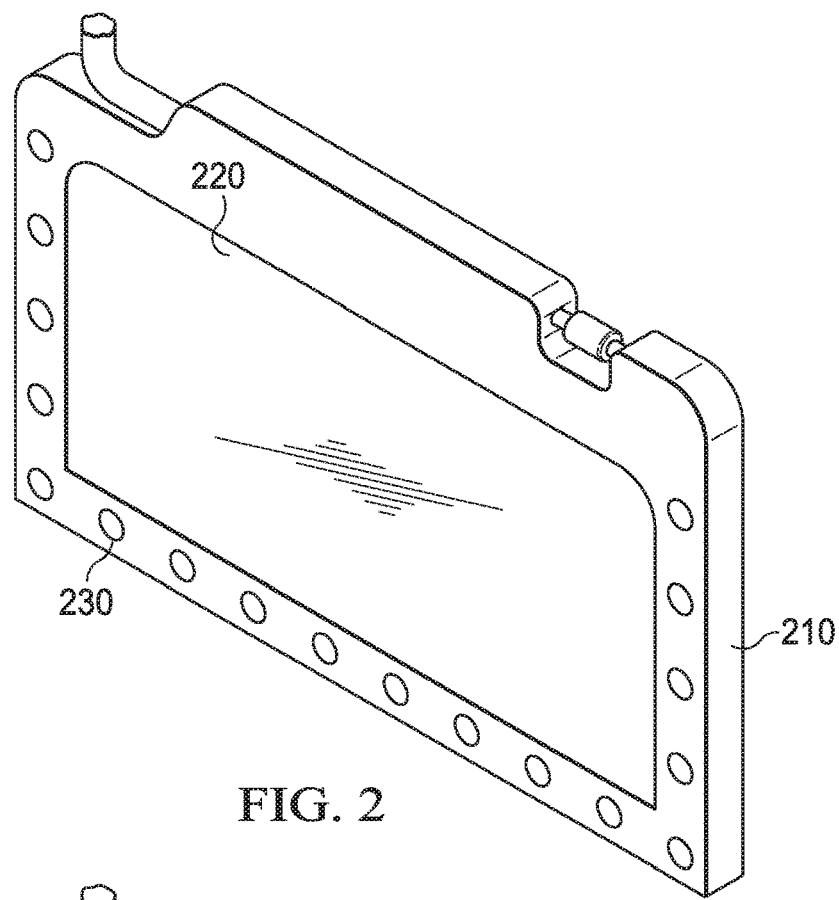
FIG. 2 is a perspective view of another exemplary mirror apparatus, in accordance with some embodiments of this disclosure.

FIG. 2 is a perspective view of another exemplary mirror apparatus, in accordance with some embodiments of this disclosure. In these embodiments, the mirror body 220 (e.g., comprising a mirror body section) and light element 230 are shown as being integrated into or attached to a visor 210 in a motor vehicle.

Figure 3:
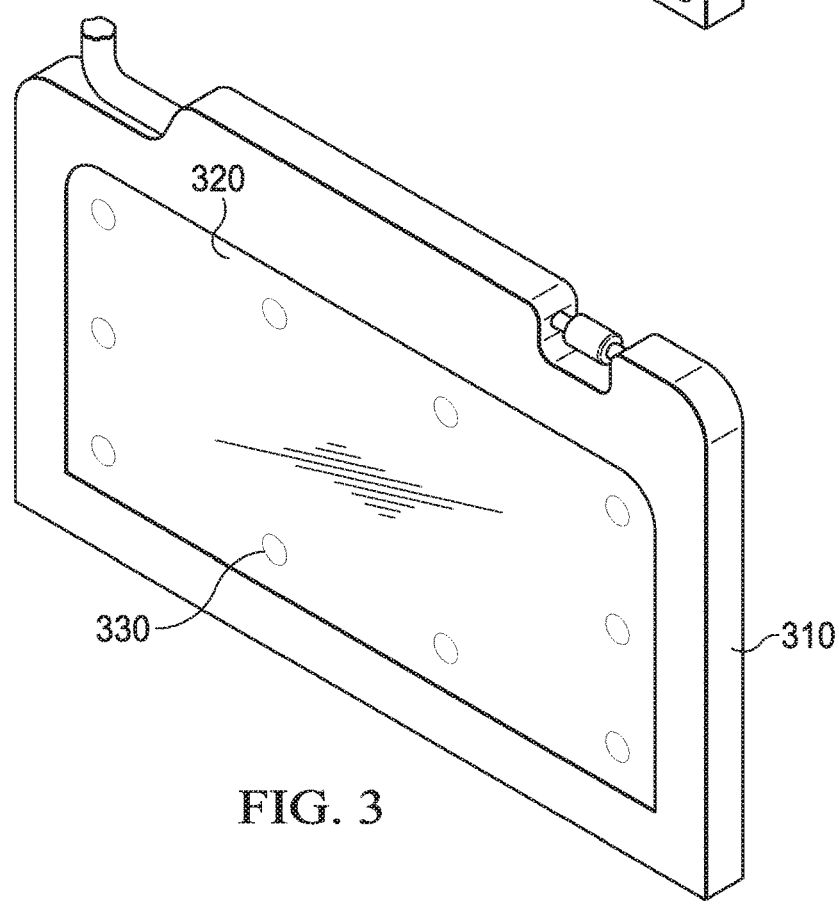
FIG. 3 is a perspective view of another exemplary mirror apparatus, in accordance with some embodiments of this disclosure.

FIG. 3 is a perspective view of another exemplary mirror apparatus, in accordance with some embodiments of this disclosure. In these embodiments, the mirror body 320 and light element 330 are shown as being integrated into or attached to a visor 310 in a motor vehicle.

Figure 4:
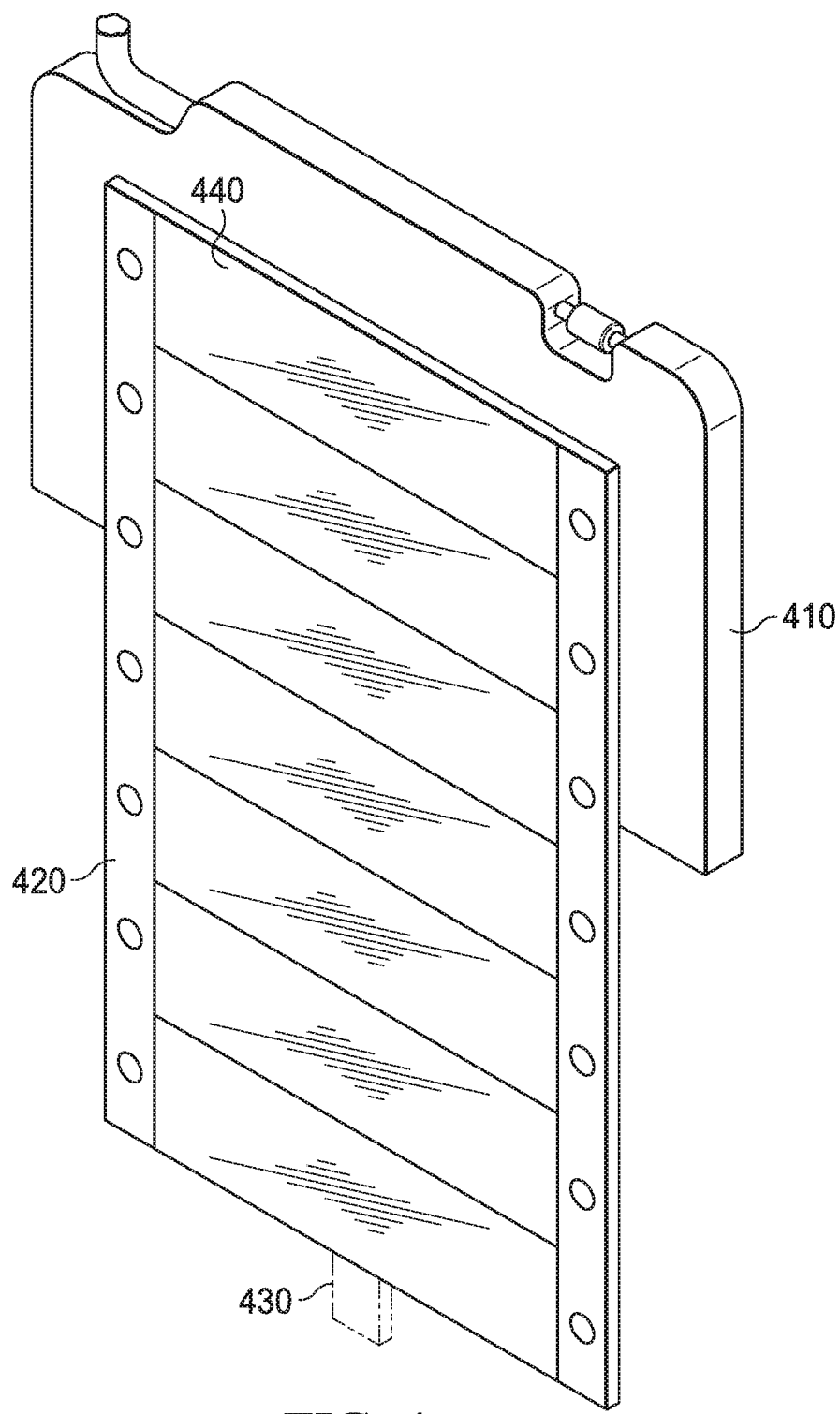
FIG. 4 is a perspective view of another exemplary mirror apparatus, in accordance with some embodiments of this disclosure.

FIG. 4 is a perspective view of another exemplary mirror apparatus, in accordance with some embodiments of this disclosure. In these embodiments, the mirror body 440 and light element located outside 420 the reflective surface of the mirror body are shown as being integrated into or attached to a visor 410 in a motor vehicle. The figure also shows a lever 430 for expanding and/or contracting the mirror apparatus.

Figure 5:
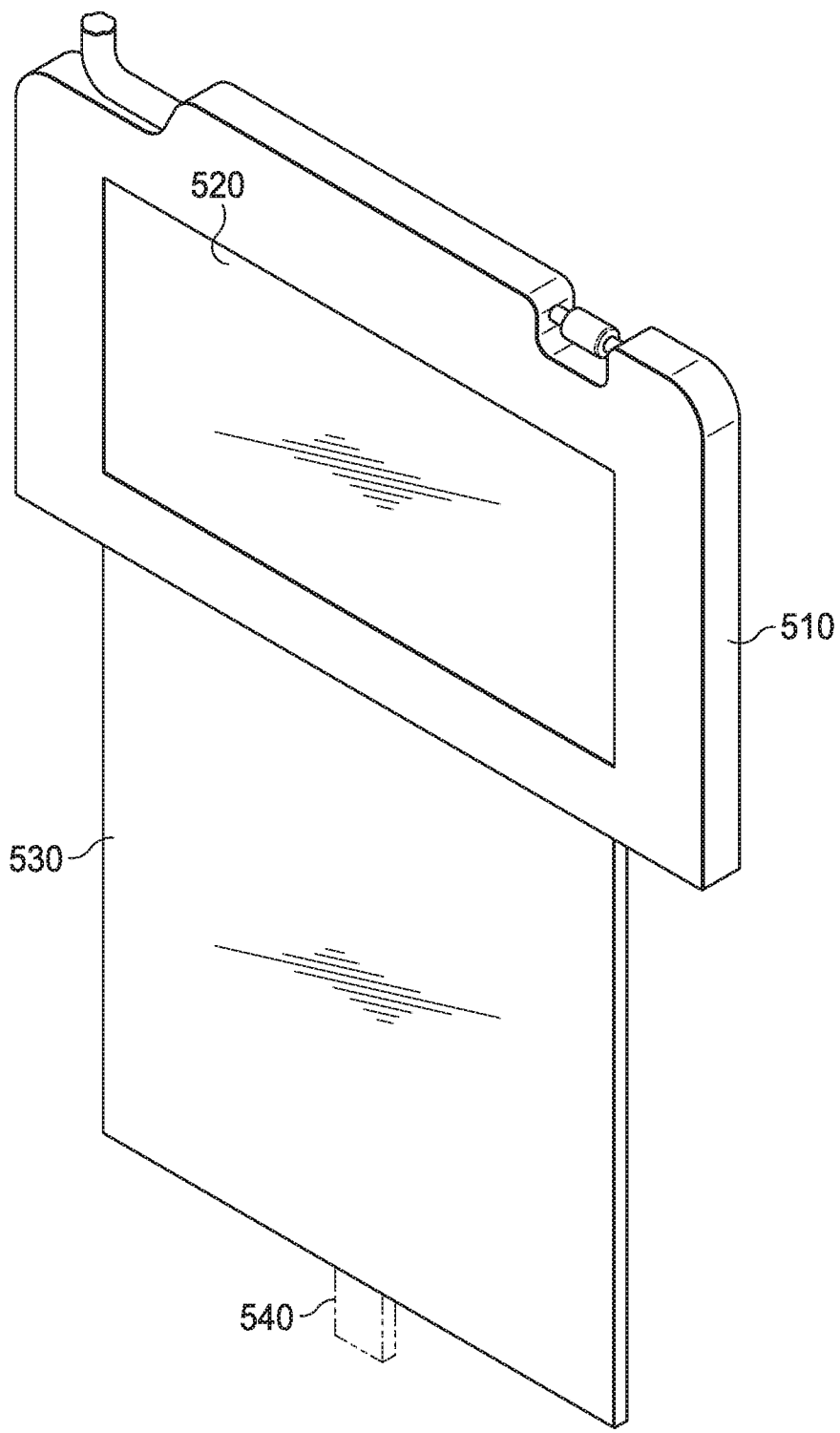
FIG. 5 is a perspective view of another exemplary mirror apparatus, in accordance with some embodiments of this disclosure.

FIG. 5 is a perspective view of another exemplary mirror apparatus, in accordance with some embodiments of this disclosure. In these embodiments, the mirror body 520 and exposable/expandable light element 530 (or additional exposable/expandable mirror body 530) are shown as being integrated into or attached to a visor 510 in a motor vehicle. The element/lever 540 may be used to expose/expand and contract/hide the light element 530 (or additional mirror body 530) into a compartment (e.g., hidden compartment) located in the visor 510 (e.g., located in a bottom edge of the visor or located along a back surface of the visor). The exposable object 530 provides additional light or mirror functionality to the mirror functionality provided by mirror body 520. Any mirror body illustrated or described in this disclosure comprises one or more mirror body sections.

Figure 6:
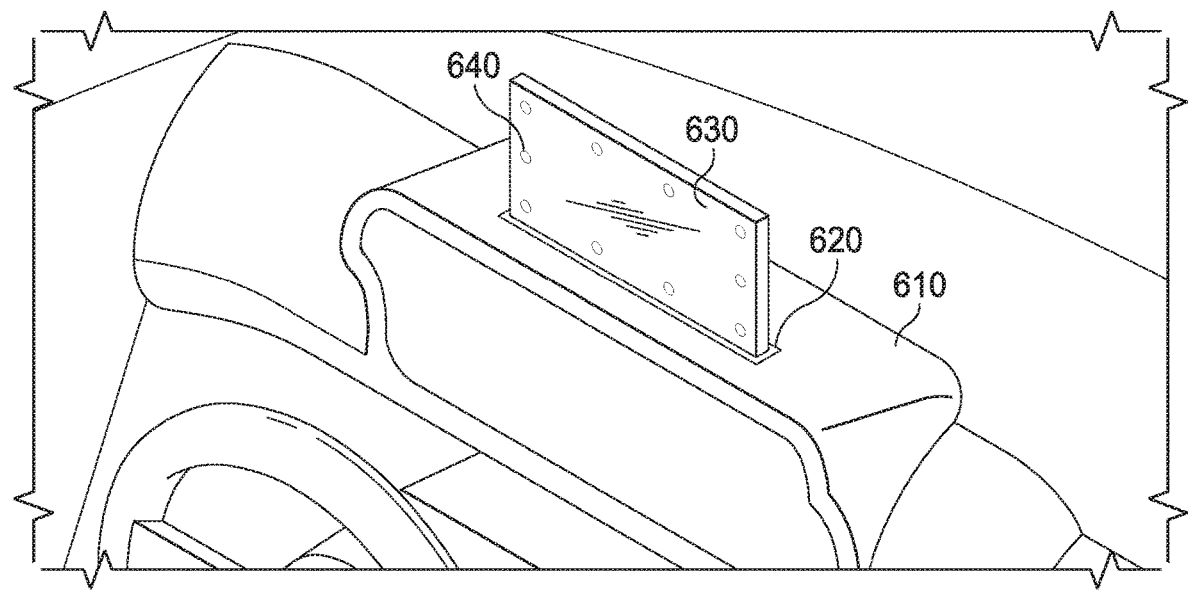
FIG. 6 is a perspective view of another exemplary mirror apparatus, in accordance with some embodiments of this disclosure.

FIG. 6 is a perspective view of another exemplary mirror apparatus, in accordance with some embodiments of this disclosure. In these embodiments, the mirror body 630 comprising light element 640 is exposable from hidden compartment 620 in a dashboard 610 (or any other portion at or near the front of the interior portion (e.g., near driver or passenger)) of a motor vehicle. The mirror body may be completely detachable from the dashboard or it may be exposed/pulled up and then swiveled or rotated or moved (or have its angular orientation adjusted) in accordance with the wishes of a user.

Figure 7:
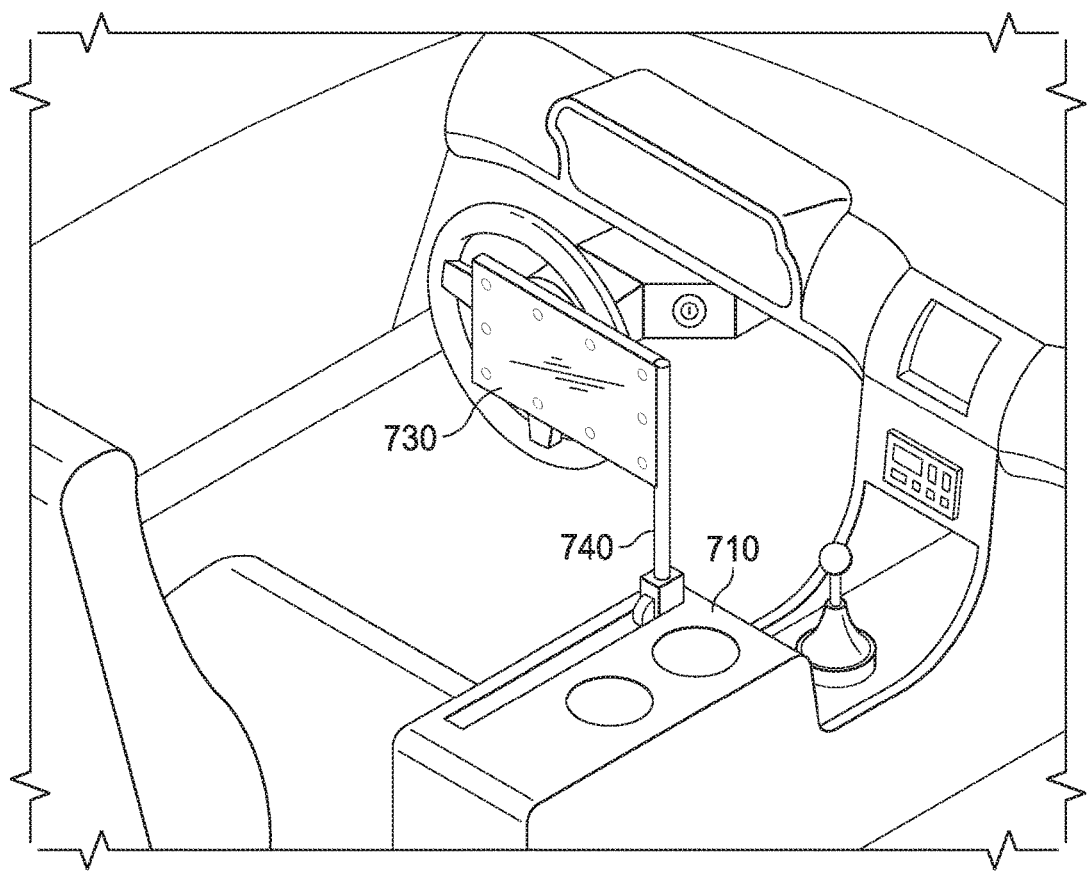
FIG. 7 is a perspective view of another exemplary mirror apparatus, in accordance with some embodiments of this disclosure.

FIG. 7 is a perspective view of another exemplary mirror apparatus, in accordance with some embodiments of this disclosure. In these embodiments, the mirror body 730 comprising light elements is exposable from hidden compartment in a center console (or any other portion near the central front portion) of a motor vehicle. The mirror body may be completely detachable from the console or it may be exposed/pulled up and then swiveled or rotated or moved (or have its angular orientation adjusted) using element 740 or any other element in accordance with the wishes of a user.

Figure 8:
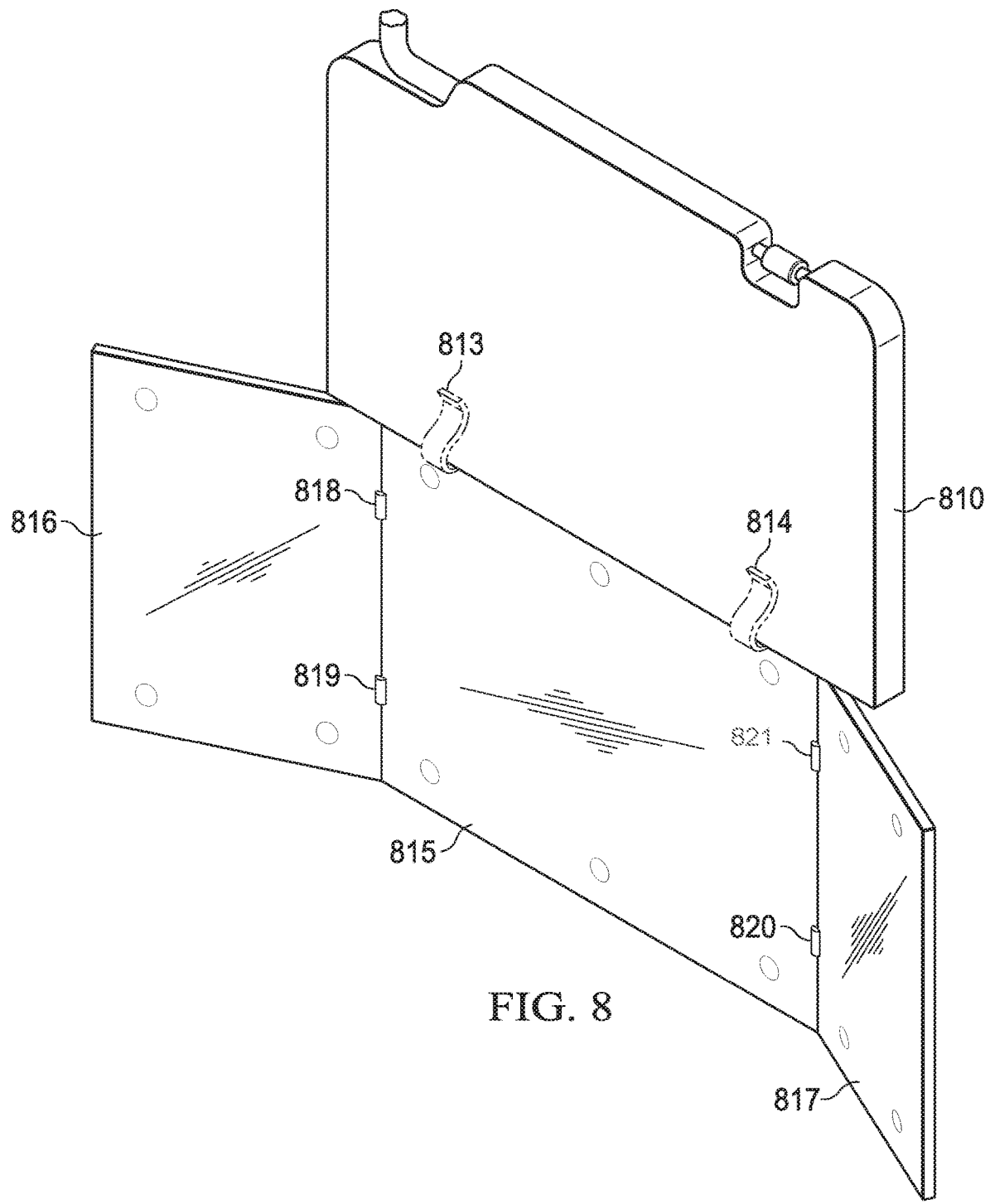
FIG. 8 is a perspective view of another exemplary mirror apparatus, in accordance with some embodiments of this disclosure.

FIG. 8 is a perspective view of another exemplary mirror apparatus, in accordance with some embodiments of this disclosure. In these embodiments, the apparatus is attachable to a visor 810 using attachment elements 813 and 814. The apparatus comprises a mirror body including mirror body sections 815, 816, and 817. Each of the mirror body sections includes light elements (unlabeled) as shown in the figure. The mirror body sections may be attached (e.g., detachably or non-detachably attached) to the other mirror body sections using attachment elements 818, 819, 820, and 821.

In some embodiments, the mirror body section(s) (e.g., 815, 816 and/or 817) do not physically touch or contact the visor (or other object or surface to which the apparatus needs to be connected) when the apparatus is connected to the visor (or other object or surface to which the apparatus needs to be connected). In some embodiments, only the attachment element(s) (and/or connector surface and/or object as described in this disclosure) physically touch or contact the visor (or other object or surface to which the apparatus needs to be connected). In other alternate embodiments, the mirror body section(s) may physical touch or contact the visor (or other object or surface to which the apparatus needs to be connected). In some embodiments, a gap or space exists between the mirror body section(s) and the visor (or other object or surface to which the apparatus needs to be connected). This gap may be less than or equal to (or greater than) at least one of 0.25 inches, 0.5 inches, 0.75 inches, one inch, two inches, three inches, four inches, five inches, six inches, seven inches, eight inches, nine inches, ten inches, eleven inches, twelve inches, etc. In some embodiments, the attachment element(s) (and/or connector surface and/or object as described in this disclosure) may be present in this gap. In some embodiments, the attachment element(s) physically contact or touch the visor (or other object or surface to which the apparatus needs to be connected) along a point and/or an edge of the visor (or other object or surface to which the apparatus needs to be connected) and not along a surface (e.g., a partial surface, an entire surface, etc.) of the visor (or other object or surface to which the apparatus needs to be connected). In other embodiments, the attachment element(s) physically contact or touch the visor (or other object or surface to which the apparatus needs to be connected) along a surface (e.g., a partial surface, an entire surface, etc.) of the visor (or other object or surface to which the apparatus needs to be connected. In some embodiments, the apparatus does not have to rest along a surface (e.g., a partial surface, an entire surface, etc.) of the visor (or other object or surface to which the apparatus needs to be connected). In other embodiments, the apparatus rests (e.g., using magnets) along a surface (e.g., a partial surface, an entire surface, etc.) of the visor (or other object or surface to which the apparatus needs to be connected). In some embodiments, the attachment element does not wrap around the visor (or other object or surface to which the apparatus needs to be connected). In some embodiments, the attachment element wraps around (e.g., partially over an edge using an over the door (or edge) clip or clasp) the visor (or other object or surface to which the apparatus needs to be connected). In some embodiments, the attachment element is in contact with a single edge (and not multiple edges) of the visor (or other object or surface to which the apparatus needs to be connected). In some embodiments, the first mirror body section or the second mirror body section may extend beyond an edge of the visor (or other object or surface to which the apparatus needs to be connected).

In some embodiments, a single attachment element (or multiple attachment elements) is provided (i.e., connecting the apparatus and the visor object surface and/or edge and/or point) such that the apparatus is rotatable with respect to the visor or other object surface and/or edge and/or point to which the apparatus is connected. The single attachment element (or multiple attachment elements) may be rigidly (or tiltably) fixed in place such that the apparatus can move at least one of up, down, sideways and/or tilt up, down, left, right and/or move front and back so that a user of the apparatus can position the apparatus to see themselves in the mirror apparatus' reflective surface(s) and/or display screens. In some embodiments, the attachment element may comprise a ball lever (e.g., metallic ball lever), rod, etc. In some embodiments, individual elements of the apparatus may be tiltable (i.e., their angular orientation may be adjustable) such as mirror body sections, light elements, display screens, compartments, etc.

In some embodiments, a top surface (e.g., behind the reflective surface) of mirror body section 815 (or any other edge or point or mirror body section of the apparatus) may be connected or coupled or attached (e.g., detachably or non-detachably) to a connector surface or connector object. The connector surface or connector object may be connected (e.g., at or along a point, edge, or surface) to the visor (and/or other object's surface, edge, and/or point, i.e., the object to which the apparatus needs to be connected) using one or more attachment elements (e.g., two attachment elements) as described in this disclosure. The connector surface or object is connected, coupled, or otherwise attached (e.g., detachably or non-detachably) using at least one or more other second attachment elements (e.g., any of the attachment elements described in this disclosure) to the mirror body section 815 (and/or any of the other mirror body sections or other elements, points, or edges of the apparatus). The connector surface or object may be held still (or in place; or alternatively be movable and/or tiltable) with respect to the visor (or other object to which the apparatus needs to be connected). The mirror body section 815 (and/or any of the other mirror body sections or other elements, points, or edges of the apparatus) may move at least one of up, down, sideways and/or tilt up, down, left, right and/or move front and back with respect to the connector surface or object (and/or with respect to the visor or other object to which the connector surface or object is connected). This movement and/or change in angular orientation of the mirror body section 815 (and/or any of the other mirror body sections or other elements, points, or edges of the apparatus) is made possible using the second attachment element, which may be any attachment element described in this disclosure. In some embodiments, the connector surface or object may comprise both a connector surface and object (e.g., the object protrudes outwards from the connector surface). The connector surface and/or object enables the apparatus (e.g., the mirror body section(s), light elements, display screens, etc.) to change its position (e.g., up, down, left, right, front, back with respect to the visor or other object to which the connector surface or object is connected) and angular orientation with respect to the visor or other object.

Figure 9:
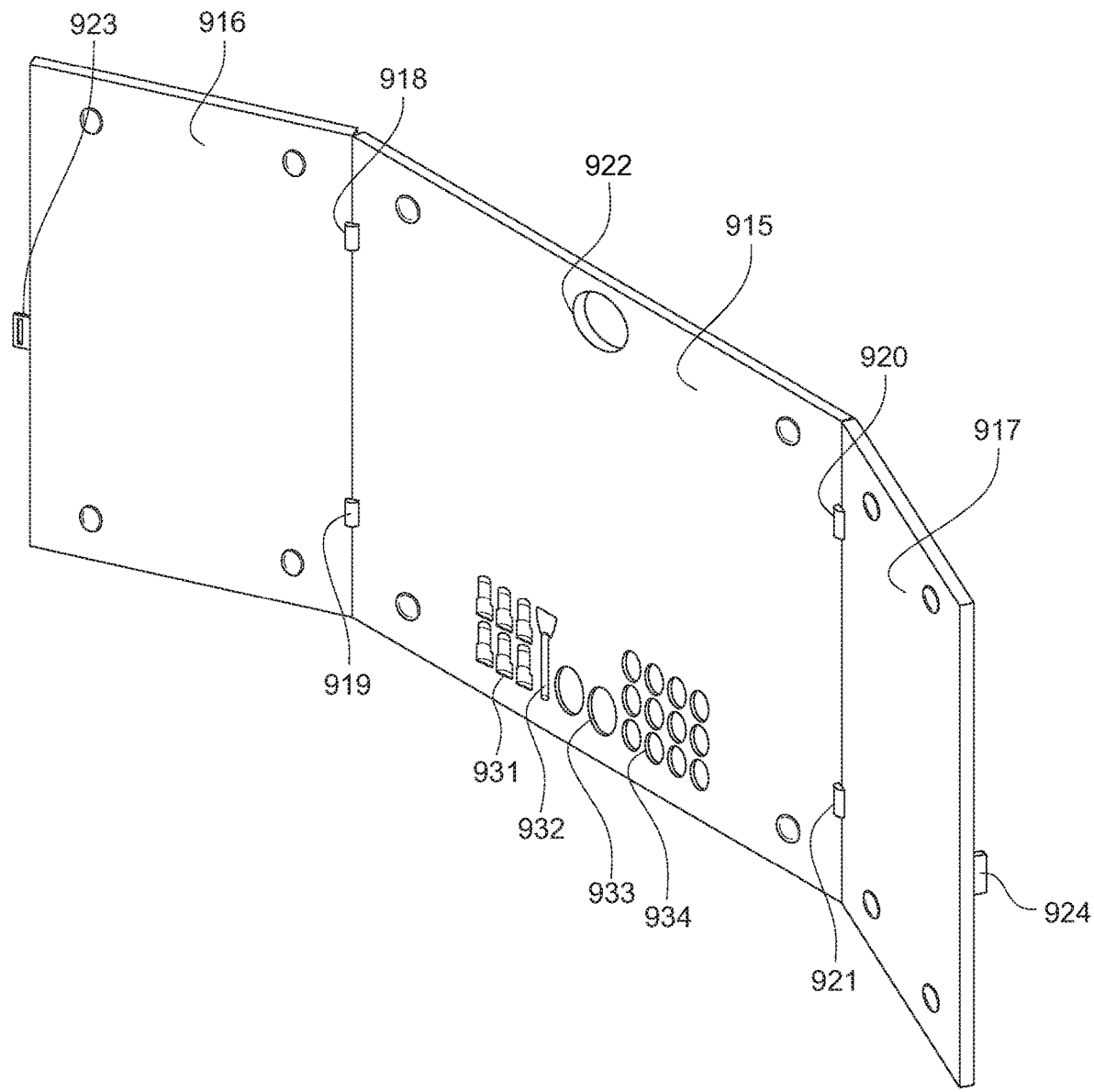
FIG. 9 is a perspective view of another exemplary mirror apparatus, in accordance with some embodiments of this disclosure.

FIG. 9 is a perspective view of another exemplary mirror apparatus, in accordance with some embodiments of this disclosure. In these embodiments, the apparatus comprises mirror body sections 915, 916, and 917. Each of the mirror body sections includes light elements (unlabeled). The mirror body sections are connected or attached (e.g., detachably or non-detachably attached) or coupled to each other using attachment elements 918, 919, 920, 921. While two attachment elements are shown between each mirror body section, more or fewer attachment elements may be used. The mirror body section 915 may comprise a hole or aperture 922. A lens or camera element may be placed in the hole or aperture or on the back side of the mirror apparatus such that the lens or camera elements captures photos or video of activity (e.g., user makeup activity) in front of the reflective surfaces of the mirror body sections through the hole or aperture. The mirror body section may also comprise one or more compartments, ridges, depressions, pockets, platforms, inserts, etc., for holding, storing, or securing lipstick 931, blush 932, powder 933, and/or eyeshadow 934 (e.g., in the open expanded state and/or in the folded contracted state). These cosmetic products or items are for exemplary purposes only and may be replaced with other cosmetic or non-cosmetic items or products. These compartments, ridges, depressions, platforms, pockets, inserts, etc., may be located in other parts of the apparatus (e.g., outside the reflective mirror surface or in or under other mirror body sections, behind the mirror body sections, on the side of the mirror body sections, etc.) in other embodiments. In some embodiments, a platform or a stand may be located behind the apparatus to position the lens or camera element such that it is able to capture images through the hole or aperture. Closing or retaining elements 923 and 924 may be provided so that the mirror apparatus can be secured in a closed position (i.e., contracted state) such that minor forces or pressure do not cause the mirror apparatus to open (i.e., expanded state). In some embodiments, the mirror body may be made of soft material to absorb impacts associated with spills or drops such that the mirror reflective surface does not crack. In some embodiments, only one of elements 923 and 924 may be needed to hold the mirror apparatus in a closed position. In some embodiments, the elements 923 and/or 924 may be integrated into the mirror body section (e.g., the reflective surface or material or area surrounding the reflective surface) such that the elements do not protrude outside the surface area of the apparatus. In some embodiments, the retaining elements 923 and/or 924 may, additionally or alternatively, perform the function of enabling the apparatus to enabling switching from the expanded open state to the contracted folded state or for switching from the contracted folded state to the expanded open state.

In some embodiments, one or more edges or surface of the apparatus may glow in the dark. In some embodiments, the apparatus may include an ambient light intensity detector such that the light element(s) in the apparatus are automatically activated along with appropriate changes in intensity and/or brightness based on the amount of ambient light in the environment of the apparatus.

Figure 10:
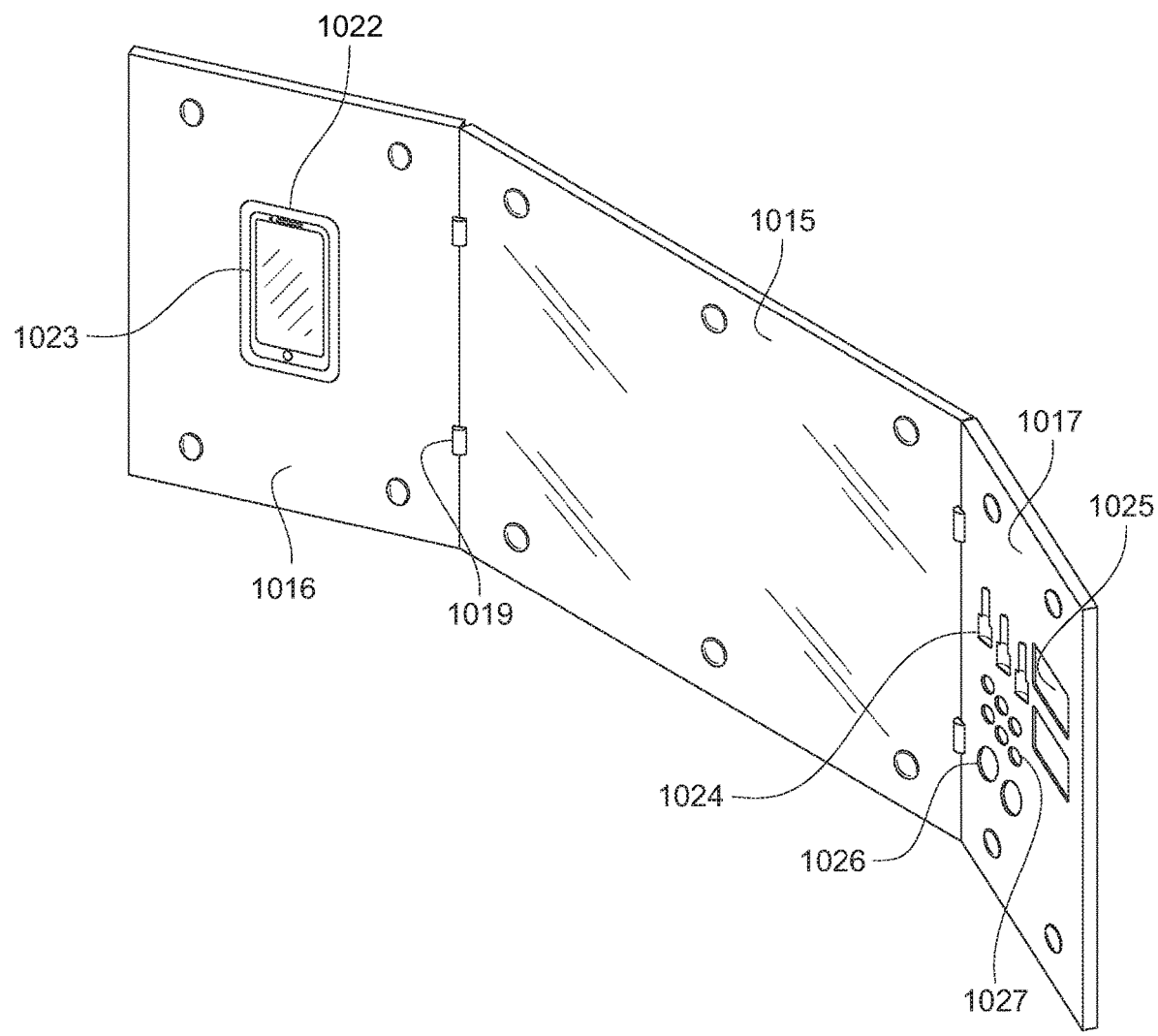
FIG. 10 is a perspective view of another exemplary mirror apparatus, in accordance with some embodiments of this disclosure.

FIG. 10 is a perspective view of another exemplary mirror apparatus, in accordance with some embodiments of this disclosure. In these embodiments, the apparatus comprises mirror body sections 1015, 1016, and 1017. Each of the mirror body sections includes light elements (unlabeled). The mirror body sections are connected or attached (e.g., detachably or non-detachably attached) or coupled to each other using attachment elements (e.g., attachment element 1019). While two attachment elements are shown between each mirror body section, more or fewer attachment elements may be used. The apparatus may comprise a compartment, ridge, depression, platform, insert, or the like (i.e., element 1022) to store or hold or secure an image capturing device such as a mobile phone 1023, or tablet or watch or other electronic or computing device (or other non-computing item such as a cosmetic or makeup item). The mirror body section (e.g., 1017 and/or any other mirror body section) may also comprise one or more compartments, ridges, depressions, platforms, pockets, inserts, etc., for holding, storing, or securing lipstick 1024, larger powder 1026, smaller powder 1027, and other makeup items 1025. These compartments, ridges, depressions, platforms, pocket, insert, etc. may be located in other parts of the apparatus (e.g., outside the reflective mirror surface or in or under other mirror body sections, behind the mirror body sections, on the side of the mirror body sections, etc.) in other embodiments. When products (e.g., lipstick, powder, blush, eyeshadow, etc.) are placed in these compartments, ridges, depressions, platforms, pockets, inserts, etc., they may be secured such that covers or doors or windows of these compartments may be located at substantially the same surface level as that of the reflective surfaces in which these compartments, ridges, depressions, platforms, pockets, inserts, etc., are located. In other embodiments, these compartments, ridges, depressions, platforms, pockets, inserts, etc., or products or items placed in these locations may protrude from the reflective surface area.

Figure 11A:
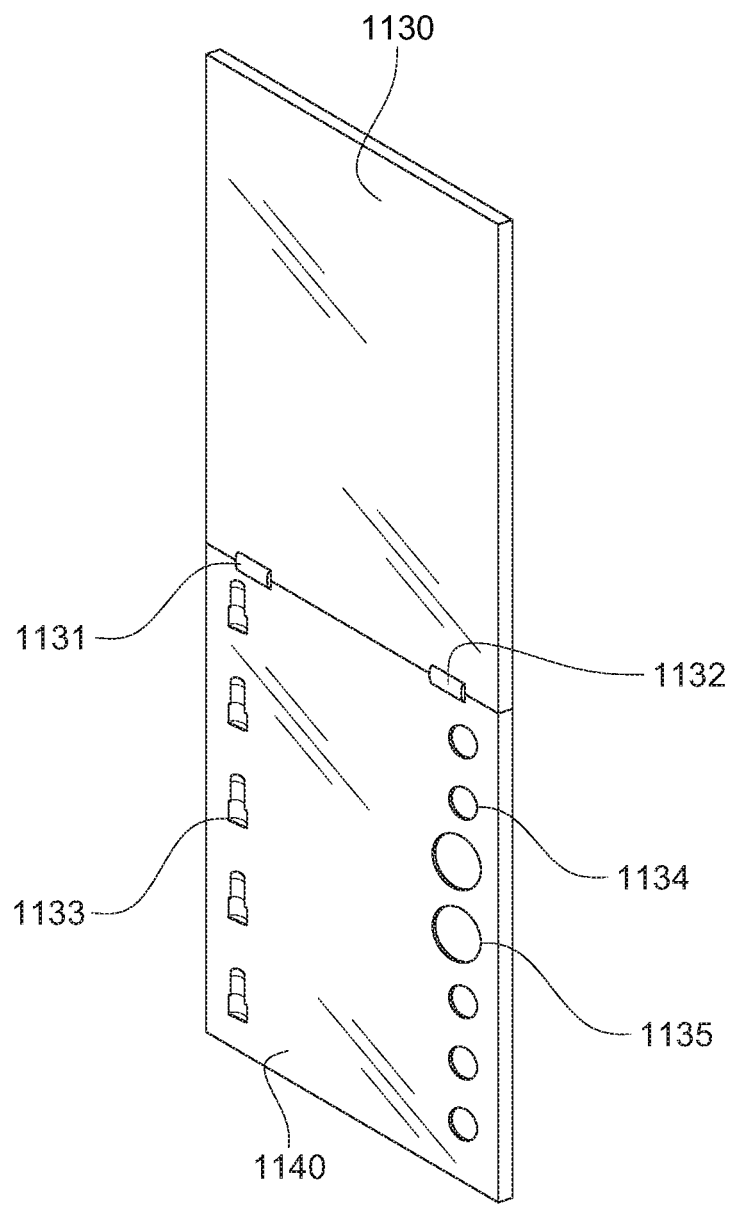
FIG. 11A is a perspective view of another exemplary mirror apparatus, in accordance with some embodiments of this disclosure.

FIG. 11A is a perspective view of another exemplary mirror apparatus, in accordance with some embodiments of this disclosure. In these embodiments, the apparatus comprises mirror body sections 1130 and 1140. These mirror body sections are connected, attachable (e.g., detachably or non-detachably) or coupled using attachment elements 1131 and 1132. In some embodiments, more or fewer attachment elements may be provided. The mirror body section 1140 may comprise compartments, ridges, depressions, platforms, pockets, inserts, etc., for lipstick 1133, eyeshadow 1134, and powder 1135. The type of cosmetic product or item described with respect to any of the embodiments herein is for exemplary purposes only. Additionally, the compartments, ridges, depressions, platforms, pockets, inserts, etc., for cosmetic items may be located on or in more than one mirror body section (e.g., inside or outside the reflective surface area of the mirror body section). In some embodiments, neither the compartments, ridges, depressions, platforms, pockets, inserts, etc., or the cosmetic items located in them physically touch the opposite reflective surface when the apparatus is in the closed, folded contracted state such that the mirror body sections 1130 and 1140 are folded onto each other. In some embodiments, the compartments, ridges, depressions, platforms, pockets, inserts, etc. may be located near the center of a reflective mirror surface area. In some embodiments, the compartments, ridges, depressions, platforms, pockets, inserts, etc. may be located outside the reflective surface area of a mirror body section. In some embodiments, the compartments, ridges, depressions, platforms, pockets, inserts, etc., may be located on or in a mirror body section that does not include a reflective surface area.

Figure 11B:
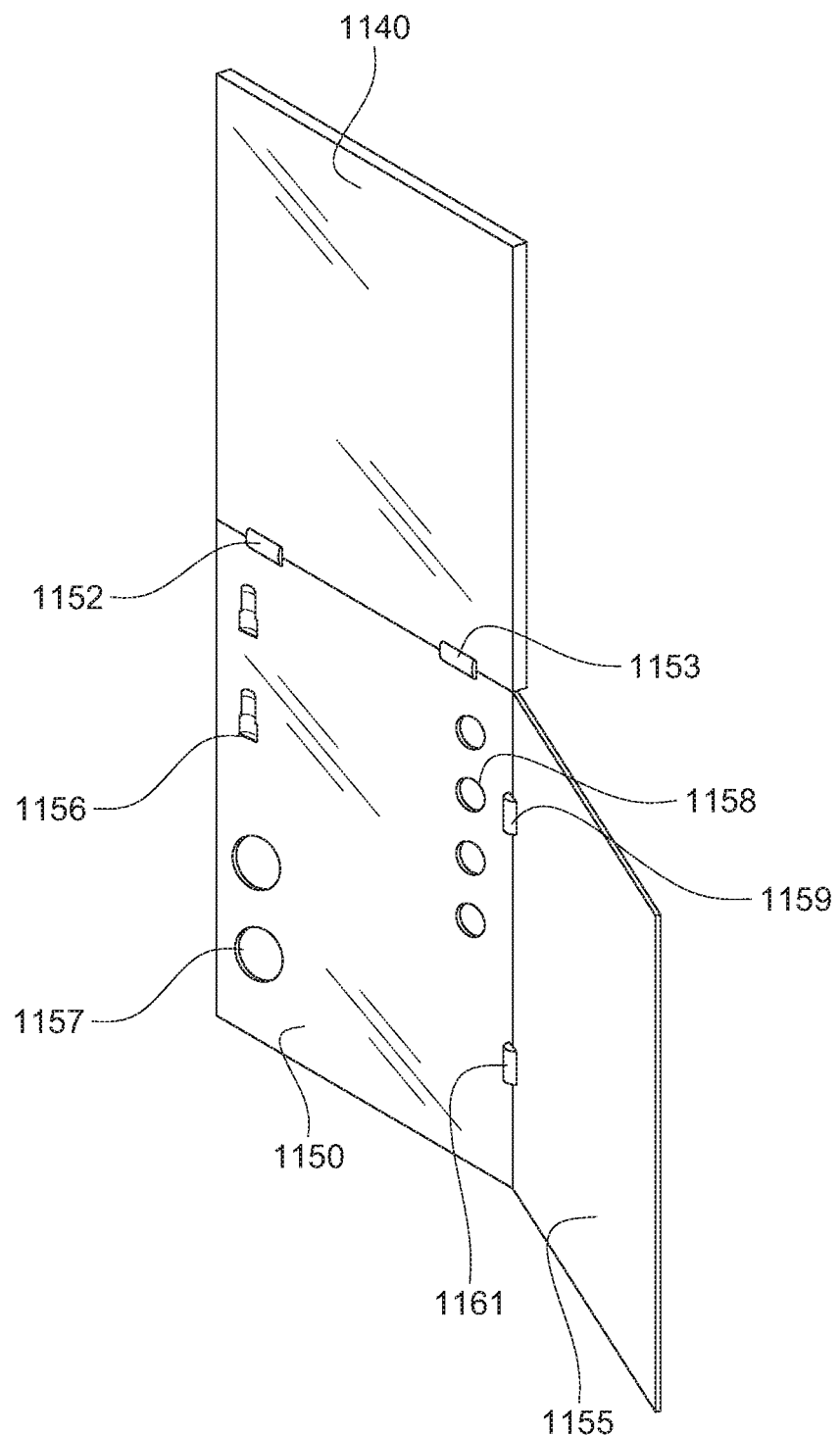
FIG. 11B is a perspective view of another exemplary mirror apparatus, in accordance with some embodiments of this disclosure.

FIG. 11B is a perspective view of another exemplary mirror apparatus, in accordance with some embodiments of this disclosure. The apparatus is FIG. 11B is similar to FIG. 11A in that the apparatus has mirror body sections 1140 and 1150, attachment elements 1152 and 1153, and compartments, ridges, depressions, platforms, pockets, inserts, etc., for lipstick 1156, eyeshadow 1158, and powder 1157. Additionally, the mirror body section 1150 is connected, attached (e.g., detachably or non-detachably), or coupled to a cover 1155. In some embodiments, the cover may be made of a soft material and may be used to separate the mirror body sections 1140 and 1150 in the contracted folded state. The cover may be made of cloth, foam, leather, rubber, silicone, sponge, cushion (or other pillow-like material) or any other pliable, bendable, plastic, or soft material that may or may not comprise pores or pockets for holding air. In some embodiments, the cover may be in physical contact with at least one of the mirror body sections and/or their reflective surfaces and/or any compartments, ridges, depressions, platforms, pockets, inserts, etc., or any items in those locations, comprised on or in a mirror body section. In some embodiments, the cover may absorb force or pressure associated spilling or dropping the apparatus and thereby function as a shock absorber to prevent damage or cracks or breakage to any other elements of the apparatus, including the reflective surface, light elements (if present in the apparatus), compartments, ridges, depressions, platforms, pockets, inserts, etc. In some embodiments, the attachment elements 1159 and 1161 may be any of the attachment elements described in this disclosure. In some embodiments, the cover may not even be attached to a mirror body section and may instead be a separate item that is placed between the mirror body sections in the contracted folded state. In some embodiments, the cover is not in physical contact with the reflective surface area of the mirror body sections (either one or both mirror body sections). In some embodiments, the cover is placed between the mirror body sections such that the cover folds onto the mirror body sections (e.g., the mirror body section 1150). In some embodiments, additionally or alternatively, the cover may be placed on or folded on (and may be in contact with) the top surface (i.e., on the other side of the reflective surface) of a mirror body section that folds on top of the other mirror body section. Additionally or alternatively, in some embodiments, the cover may be placed below and folded under (and may be in contact with) the bottom surface (i.e., on the other side of the reflective surface) of a mirror body section that folds under the other mirror body section. In some embodiments, multiple covers may be provided that are placed (or folded) at least one of on top of the top mirror body section, under the bottom mirror body section, in between the two mirror body sections (e.g., between the two reflective surfaces). In some embodiments, one or more covers may be integrated into the mirror body sections such that the top and bottom outer surfaces of the apparatus are covered with covers. In some embodiments, each of the covers may provide shock absorbent protection for the mirror surfaces, light elements, circuitry, display screens, etc., located in the apparatus. In some embodiments, the cover may have compartments, ridges, depressions, platforms, pockets, inserts, etc. for storing, securing, or placing any cosmetic items or products (or electronic devices such as mobile phones) or for accommodating protrusions of any of these items or products or devices outwards from the mirror body sections. In some embodiments, the cover is optional and may not be included in the apparatus. In some embodiments, the cover may be rotatable (e.g., about the attachment elements) with respect to the mirror body section to which it is attached.

In some embodiments, any of the elements of any of the embodiments described in this disclosure may be optional (i.e., not provided in a particular apparatus).

Figure 11C:
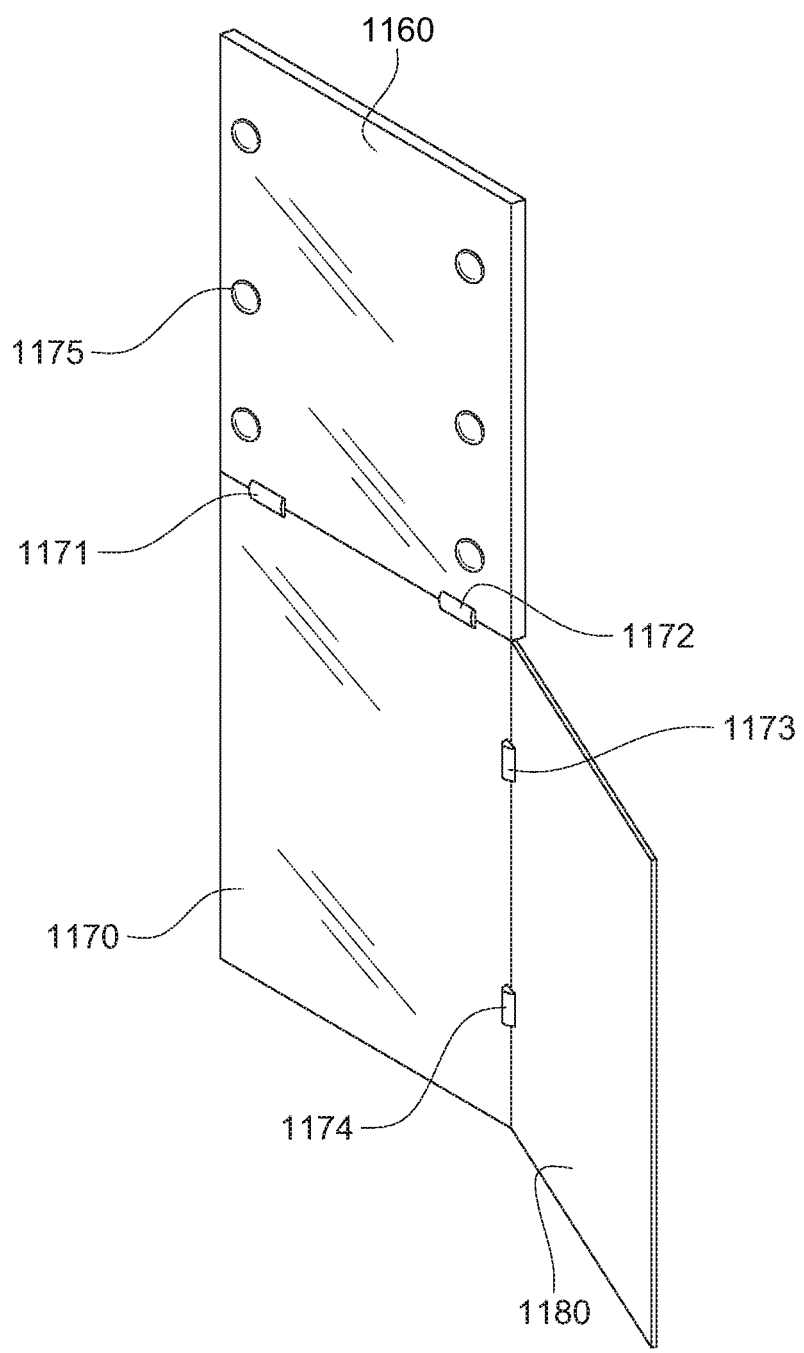
FIG. 11C is a perspective view of another exemplary mirror apparatus, in accordance with some embodiments of this disclosure.

FIG. 11C is a perspective view of another exemplary mirror apparatus, in accordance with some embodiments of this disclosure. The apparatus is FIG. 11C is similar to FIG. 11B in that the apparatus has mirror body sections 1160 and 1170, attachment elements 1171 and 1172 (for attaching the mirror body sections to each other), cover 1180, and attachment elements 1173 and 1174 (for attaching the cover to the mirror body section 1170). In some embodiments, the cover may be attachable to more than one mirror body section. In this figure, the mirror body section 1160 includes light element(s) 1175. In some embodiments, the light element(s) may be additionally or alternatively included on the mirror body section 1170 or on (e.g., at surface level or protruding out of the surface level) or in (e.g., under the surface level) the cover 1180. Any of the features described with respect to any of the figures or embodiments described in this disclosure may be applied to or implemented in any of the other figures or embodiments described in this disclosure. In some embodiments, the cover is optional and may not be included in the apparatus.

Figure 12:
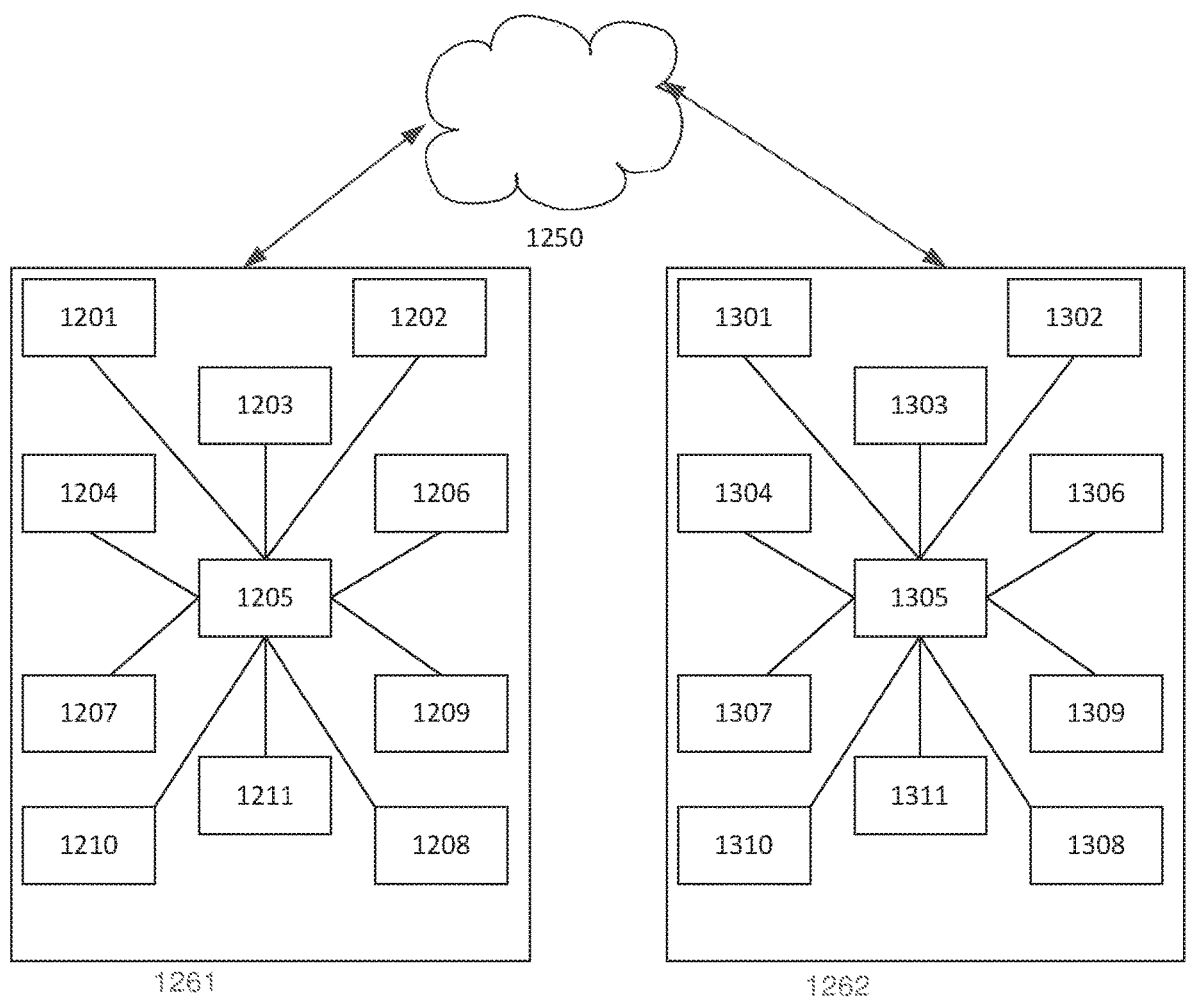
FIG. 12 is an illustration of a mirror apparatus and environment, in accordance with some embodiments of this disclosure.

FIG. 12 is a illustration of a mirror apparatus and associated network environment, in accordance with some embodiments of this disclosure. Two mirror apparatuses 1261, 1262 are shown. Each mirror apparatus comprises a control system or operating system 1205 and 1305 which is in communication with a display screen 1201 and 1301, a video camera 1202 and 1302, a processor 1203 and 1303, a power control system 1204 and 1304, a power source (optional) 1206 and 1306, a light element 1207 and 1307, a network communication device (e.g., short range/long range communication device) 1209 and 1309, an input/output (I/O) unit 1210 and 1310, an application programming interface 1208 and 1308, and memory 1211 and 1311, all of which are comprised in the mirror apparatuses. Each of these elements of a mirror apparatus has been described in other portions of this disclosure. One or more elements of each type may be provided in the apparatus. For example, multiple light elements, processors, display screens, etc., may be provided in a single apparatus. In some embodiments, the mirror apparatuses may communicate (e.g., send and/or receive data such as a video conferencing data) via the network 1250. In some embodiments, the mirror apparatuses may communicate directly with each other.

In some embodiments, the apparatus may comprise at least one edge. In some embodiments, at least one edge or two edges or three edges, four edges, five edges, six edges, etc., is less than at least one of five inches, six inches, seven inches, eight inches, nine inches, ten inches, eleven inches, twelve inches, thirteen inches, fourteen inches, fifteen inches, sixteen inches, seventeen inches, eighteen inches, nineteen inches, twenty inches, twenty-one inches, twenty-two inches, twenty-three inches, twenty-four inches when the apparatus is in the expanded state. In some embodiments, a sum of the at least one edge or two edges or three edges, four edges, five edges, six edges, etc., or a perimeter or a diameter of the apparatus, is less than at least one of five inches, six inches, seven inches, eight inches, nine inches, ten inches, eleven inches, twelve inches, thirteen inches, fourteen inches, fifteen inches, sixteen inches, seventeen inches, eighteen inches, nineteen inches, twenty inches, twenty-one inches, twenty-two inches, twenty-three inches, twenty-four inches when the apparatus is in the expanded state.

In some embodiments, in an expanded state, the apparatus (which may have any shape described herein such as elliptical, square, rectangular, triangular, etc.) may fit in a three feet by three feet quadrilateral space (e.g. bag, pursue, pocket, pouch, etc.). Therefore, in some embodiments, in the expanded state, at least one edge of the apparatus may be less than or equal to three feet. In some embodiments, in a contracted state, the apparatus (which may have any shape described herein such as elliptical, square, rectangular, triangular, etc.) may fit in a twenty inches (height) by fifteen inches (width) quadrilateral space (e.g. bag, pursue, pocket, pouch, etc.). Therefore, in some embodiments, in the contracted state, at least one edge of the apparatus may be less than or equal to twenty inches. In some embodiments, in the contracted state, at least one edge of the apparatus may be equal to or greater than two inches. In some embodiments, the apparatus is contractable or foldable (e.g., the mirror sections are foldable) along the height of the mirror (i.e., perpendicular to the ground), along the width of the mirror (i.e., parallel to the ground), or along both the height or width. In some embodiments, at least one edge of the apparatus is maintained at a same or constant length in both the contracted or expanded states. In some embodiments, any edge is not limited to any particular minimum and/or maximum length or range of lengths. In some embodiments, there may be a partially expanded state (e.g., a state in which at least one mirror section is still folded over a base section or over another mirror section) and a fully expanded state (e.g., a state in which no mirror sections are folded over each other or over a base section). In some embodiments, the contracted state is maintained using a retaining mechanism. The retaining mechanism may include magnets along an edge of the mirror body sections and/or base sections that enable the contracted state to be maintained such that the mirror body sections (e.g., an outside or edge mirror body section) are folded over other mirror body sections (e.g., a base mirror body section). Alternatively or additionally, any other element (or attachment element) may be used to maintain the contracted state (e.g., a buckle or rope or button holding the base mirror body section and the outside or edge mirror body sections). The retaining element may be an element that is integrated into a mirror body section or may be an element that protrudes out of the mirror body section.

In some embodiments, the apparatus may be located in the dashboard or other parts of the interior of motor vehicle, including any interior portion or trap described herein, including, but not limited to, the visor, rear-view mirror, console, steering wheel, air-conditioning vent, seat headboard, etc. In some embodiments, the apparatus may be pulled from (or expand from) and/or contract (or be pushed) into a compartment (e.g., a covered or hidden compartment) located in any of the interior portions of the vehicle described herein. In such embodiments, the mirror body may comprise a single mirror body section or multiple mirror body sections.

Once pulled from the compartment, the angular orientation of apparatus may be adjusted (e.g., the apparatus may swivel) to turn towards the driver side or passenger side. Alternatively, the apparatus may not be stored in the hidden compartment, and may instead be exposed in its contracted state. In some embodiments, the apparatus may be part of (e.g., connected to, attachable/detachable from, etc.) a travel case/pack or a makeup organizer/kit where the apparatus (e.g., in its contracted position) takes up less space compared to non-contractable mirrors. In such embodiments, a light element may or may not be provided in the apparatus. In some embodiments, the interior portion of the vehicle to which the apparatus is attached may represent any surface or object. Therefore, any description associated with attaching the apparatus to an interior portion of a vehicle may be equally applicable to attaching the apparatus to a desktop monitor surface, a door or another mirror (e.g., in a restroom), a back of a seat in an airplane, bus, train, car, or other motor vehicle, etc. For example, the apparatus may be attached using clip(s) to an upper and/or top edge of the desktop monitor or suction cup(s) to a screen of a desktop monitor. As a further example, the apparatus may be attached using over-the-door clip(s) to an upper and/or top edge of a door (e.g., in a restroom) or suction cup(s) to a surface of the door. Any features with respect to one or more embodiments may be equally applicable to any other embodiments. Any reference to any element (or combination of elements in the apparatus) may be equally applicable to any other elements (or combination of elements in the apparatus). In some embodiments, the apparatus, or any combination of elements described herein, may be used as a visor mirror in vehicles or any other movable apparatuses such as bicycles, motorbikes, boats, airplanes, helicopters, trains, etc. In such embodiments, the dimensions of the apparatus may be substantially similar to that of a visor mirror in motor vehicles (e.g., gas-powered or battery-powered motor vehicles). Also in such embodiments, light element(s) may be provided on the mirror, in the mirror, behind the mirror, surrounding the mirror, etc. Also in such embodiments, one or more portions of the visor mirror (e.g., the mirror portion, the light element portion, etc.) may be individually or collectively expandable or contractable.

In some embodiments, the apparatus may be attached, using any attachment element or mechanism described herein, to a base portion such as a stand. The stand may be attached to a back surface of one or more of the mirror sections (e.g., a central or base mirror section or any other mirror sections connected to the central or base mirror section as described herein). The stand may be expandable or contactable. The base of the stand may be manufactured out of material that can be gripped to a surface. More than one stand may be provided. In some embodiments, a stand may not be provided. The base portion may be portable or fixed. The base portion may comprise any attachment receptacle, element, or surface to attach to the apparatus. If the base portion has a surface, it may be flat or curved. In some embodiments, the length and/or width of the apparatus may be less than, equal to, or greater than the length and/or width of the object (e.g., a visor) to which the apparatus is attached. In some embodiments, at an edge where two mirror sections are adjacent to each other, a mirror portion of each mirror portion may extend to a border of the edge, and at outside edge of the mirror portion In some embodiments, the apparatus, or any combination of elements described herein, may be integrated into an electronic device, including a mobile computing device (e.g., mobile phone), speaker (e.g., a smart speaker or interactive speaker), watch (e.g., a smart watch), headgear, wearable computers, headphones, earphones, glasses such as smart glasses, headsets including augmented reality headsets, etc. In some embodiments, any such electronic device may be integrated into the apparatus, or any combination of elements described herein. The electronic device may comprise at least one of a processor, a memory, a data storage such as a hard drive, etc. In some embodiments, various functions described herein such as changing the state of the apparatus (e.g., from expanded state to contracted state, or vice versa), or activating or deactivating the light element, changing the intensity, brightness, color, or other light characteristics of one or more light elements may be accomplished using voice commands, or other electronic device input (e.g., switch input via physical or virtual switch (e.g., on a screen display) integrated into and/or communicating with the various elements on the apparatus). In some embodiments, control of light characteristics (e.g., intensity, brightness, color, etc.) of each light element (of a plurality of light elements) may be accomplished individually and without affecting the light characteristics of the other light elements in the apparatus. In some embodiments, the electronic device described herein may be a camera or image-capturing device. The image-capturing device may be used to capture images of user using any voice or manual or virtual input commands described herein. The image-capturing device may be in wireless communication (e.g., long-range such as Wi-Fi or cellular, or short-range such as NFC, Bluetooth, Infrared, Wi-Fi, etc.) with a cloud server or local or remote computing device (e.g., mobile phone or printer) such that captured images can be instantly sent to the to the cloud server or local or remote computing device. In some embodiments, the printer may be a photo printer that can print photos on paper specifically configured or designed for printing color photos. In some embodiments, the apparatus may comprise a display screen located adjacent to the mirror, wherein the display screen is in communication with the electronic computing device integrated into the apparatus. The display screen may be used to display an image (e.g., a live image or previously captured image) of the user as captured by the image-capturing device. The user may input (e.g., using voice commands or physical or virtual input commands) information to the computing device such that characteristics (e.g., color, sharpness, etc.) of the captured image on the display screen may be changed. In some embodiments, any such mirror that is integrated into or has an integrated electronic/computing device may referred to as a smart mirror or intelligent mirror. In some embodiments, a mobile device application (e.g., an app for executing on a mobile device such as a mobile phone, watch, laptop, tablet, car, etc.) may be provided for controlling or providing any of the functions described herein. In some embodiments, a telecommunication device for placing and receiving calls can be integrated into the apparatus. In some embodiments, the apparatus may capture a voice message, and create and send a message to a destination. In some embodiments, the apparatus is connected to other computing devices in a home (e.g., home security system, phone, television, etc.). The apparatus will inform a user about activity detected by the home security system, and show images captured by the security system on the mirror (either the mirror's reflective surface or a display screen in the mirror). In some embodiments, a video conference may be conducted using the mirror. In some embodiments, television may be watchable on the mirror. In some embodiments, the mirror may display a social media feed. This makes it very convenient for a user because the user is able to stay connected while doing the user's makeup.

Ins some embodiments, the function of the apparatus may be controlled using voice input. The apparatus may have an installed voice agent that can detect voice instructions, interpret or translate the voice instructions to computer-readable or executable commands, and execute functions associated with those voice instructions. In some embodiments, to accomplish this implementation or for any other functions described herein, the apparatus may include a network communication system. The network communication system can interact with remote servers via any wired or wireless communication technologies. For example, the network communication system may interact directly with remote servers via a cellular communication system located in the apparatus, a Wi-Fi communication system located in the apparatus, etc. In some embodiments, an angular orientation of the apparatus may be adjustable by orienting at least one of the apparatus or the attachment element with respect to the external surface to which the apparatus is attached using the attachment element.

Any features described herein may be applicable all types of mirrors or other glass or display surfaces. Any mirrors described herein may be manufactured with glass or any other types of materials that can be used to display reflective images or reflections. Any apparatuses described herein may be adapted to be used inside or outside a motor vehicle. Any apparatuses described herein may be used as in a stationary non-portable setting additionally or alternatively to portable settings. In some embodiments, the mirror is configured such that a reflective image is viewable in visible light; however, in other embodiments, the mirror is configured such that a reflective image is viewable in one or more other wavelengths/frequencies of electromagnetic radiation. In some embodiments, the mirror be at least one of a aluminum glass mirror, a low aluminum glass mirror, a safety glass mirror, a silkscreen printed glass mirror, a silver glass mirror, etc. In some embodiments, any mirror is manufactured by applying a reflective coating to a substrate such as glass.

In some embodiments, any of the elements described herein may be tiltable (e.g., changeable angular orientation) with respect to any other elements described herein. For example, a mirror body section (and/or light elements) may be tiltable (e.g., upwards or downwards, left or right, etc.) with regard to other mirror body sections, an attachment element (e.g., a stand, clasp, clip, etc., to a horizontal or vertical or any other surface to which the apparatus is attached), the horizontal or vertical or any other surface to which the apparatus is attached using the attachment element, etc. The range of tilting may stretch from 0 to 360 degrees. In some embodiments, the attachment element may be tiltable (e.g., upwards or downwards, left or right, etc.) with regard to mirror body sections, light elements, the horizontal or vertical or any other surface to which the apparatus is attached using the attachment elements, other attachment elements, etc. The range of tilting may stretch from 0 to 360 degrees. In some embodiments, the mirror section or the attachment element can be locked in a certain position. The locking mechanism may be pressure-based, hydraulics-based, magnet-based, clips/clasps-based, vacuum-based, button-based, etc.

In some embodiments, each mirror section may have mirror/light flaps (for additional mirror area or lights) that can are attached to any portion of a mirror section and can be opened sideways, upwards, downwards, or any other direction, or pulled to the side (e.g., from a hidden compartment), etc. In some embodiments, each of the light elements is connected to a power source such that if one of the light elements malfunctions, the other light elements are still functional. In some embodiments, the brightness or other light characteristics (e.g., color) of an individual light element is alterable by the user using a switch or other means associated with that individual light element or associated with all light elements. In some embodiments, a light projector or a disco ball may be integrated into the apparatus (e.g., at the back of the apparatus) to produce a party atmosphere. The light projector or the disco ball may be used to produce different colors or characteristics of light. In some embodiments, a music player is integrated into the mirror body or apparatus. The music player and the light projector or disco ball (either of which can rotate or spin to rotate the light) can be used to create a party atmosphere. In some embodiments, the light projector may be used to project laser lights. A fog light may be integrated into the apparatus. The fog projector may give off fog from the mirror, outside of the mirror, side of the mirror or on top of the mirror. Any references to a mirror, apparatus, mirror body, mirror body section, or other elements of the apparatus (e.g., light element, display screen, computing device, video camera, etc.) may refer to any other parts of the apparatus.

In some embodiments, the reflective surface of a mirror body section (which might comprise a display screen), may be able to stream media, e.g., live media, such as concerts, festivals, or music shows. In some embodiments, the apparatus may project or emit light, fog, and/or music, during the streaming of the media. The triggering of the project light, fog, and/or music may be accomplished using any manual, mechanical (e.g., physical button or switch), or electronic elements (e.g., touchscreen button or switch), voice activation systems (e.g., a certain word acts as a trigger), light activation systems (e.g., less than a certain amount of ambient light acts as a trigger), motion activation systems (e.g., movement in the vicinity of the apparatus acts as a trigger), etc. In some embodiments, the emitted or project light may be of any type, e.g., dark light, medium light, colored light, sparkles, flashes, timed flashes, etc. The enables a user to watch and feel the experience of the live media without actually being present at the venue from where the live media is being sourced. In some embodiments, the display screen may be able to provide an interactive experience for the user, such that the user is able to view social media posts associated with the live media on the media screen, is able to chat and/or video conference with other users at the venue of the live media. In some embodiments, the apparatus may record a performance of a user located in front the apparatus using a video camera, and send a live stream or a recorded stream of the video to a remote user, wherein the remote user is using the apparatus described in this disclosure or another computing device.

In some embodiments, a video camera is integrated into the apparatus. The video camera (or a computing device comprising or associated with the video camera) may be connected to a network (e.g., via a Wi-Fi or cellular connection or wired connection). The video camera may capture activity in front of the mirror (e.g., a makeup session, a makeup lesson, a facial cosmetics application session, etc.). The makeup session may be live streamed or broadcasted on social media (e.g., to social media followers associated with a user of the mirror who is conducting the makeup session). In some embodiments, the live video may be integrated to a dating app (e.g., a mobile or online dating app) such that the user is able to engage in a video conference with other users (e.g., a single user, multiple users, etc.) on the dating app (or an app associated with other mirror apparatus users) or upload images or video (captured by the mirror) directly to the user's profile on the dating app (or an app associated with other mirror apparatus users). In some embodiments, the video camera may be integrated into any part of the apparatus (e.g., mirror body section, back surface, light element, etc.). For example, the video camera may be integrated into the top, front, back, or side portion of the apparatus. The video camera may be detachable. In some embodiments, the video camera may protrude out of any surface of the apparatus, mirror body, or any part of the apparatus (e.g., light element, storage unit, etc.). In some embodiments, the video camera may not be readily visible or detectable by a user of the apparatus. In some embodiments, any display screen embedded into the apparatus or associated with the apparatus may display the live-streaming captured by the video camera or other pre-recorded media, photos, news articles, text messages, etc. In some embodiments, the computing device embedded into the apparatus may communicate, via short range communication, with a mobile phone, tablet, etc., such that functions of the mobile phone, tablet, etc. (e.g., sending or receiving text messages, operating an app), can be performed directly on the computing device (e.g., comprising a touchscreen) integrated into the apparatus.

In some embodiments, a video camera or still camera or a mobile phone is provided with a mirror. Additionally, the video camera or still camera or mobile phone may have a light element or any other elements, parts, features, or functions described herein.

In some embodiments, the video session in front of the mirror may be a video conference session with multiple other users, wherein video sessions of the other users are visible on a portion of the mirror or on a separate display screen integrated into the apparatus comprising the mirror. The video sessions may be associated with a video conferencing app or a social media app. In some embodiments, the reflective surface of the mirror may be configurable such that a portion of the reflective surface acts as a mirror and a portion of the reflective surface acts as or is replaced with a display screen that streams or displays video image (of the user of the mirror or other users engaged in the conference/session with the user), images (of the user of the mirror or other users engaged in the conference/session with the user), or other Internet content (e.g., associated with the activity of the video session (e.g., content related to makeup or cosmetics if the user's video session is a makeup session) or other selected content).

In some embodiments, the video camera may be an external video camera (e.g., the video camera is not integrated into the body of the apparatus comprising the mirror). The external video camera may be a dedicated video camera or any portable computing apparatus with video camera capability (e.g., mobile phone, watch, glasses, tablet, etc.). In some embodiments, the external video camera may alternatively be a lens. The external video camera (e.g., dedicated video camera or mobile phone) or lens may be placed in an aperture, opening, hole, holder, ridge, pocket (e.g., insertion or placement pocket), platform (e.g., a raised platform (e.g., with respect to the surface level of the mirror's reflective surface)), a depressed area, etc., located in the mirror (e.g., the reflective surface of the mirror). For example, an aperture or hole (from the front reflective surface to the back surface) may be present anywhere in or on or adjacent to (e.g., to the left, right, top, bottom, etc.) the front reflective surface (e.g., in the center of the surface, near an edge of the surface, or anywhere else on the surface). A locking or retaining mechanism (including any described herein) may be used to secure the phone in the aperture, opening, hole, ridge, holder, pocket (e.g., insertion or placement pocket), platform (e.g., a raised platform (e.g., with respect to the surface level of the mirror's reflective surface)), a depressed area, etc., located in the mirror (e.g., the reflective surface of the mirror). In some embodiments, a stand (e.g., integrated into the apparatus or an object separate from the apparatus) may, additionally or alternatively, be used to configure the position of the phone (including the direction/angle in which the phone faces). The stand or pocket may be positioned such that the phone is located near the top or above the top of the front reflective surface of the mirror body. As a further example, a depressed area may be present in the center of the mirror or anywhere else on the reflective surface of the mirror such that a phone can be placed in the depressed area. A locking or retaining mechanism (including any described herein) may be used to secure the phone in the depressed area. In some embodiments, a platform may be present (e.g., the surface of the platform being substantially perpendicular or angular to the reflective surface of the mirror), such that the phone or external video can be positioned on the platform. The external video camera (or the phone) can be used to capture or live stream a make up session that the user is conducting in front of the mirror. In embodiments with an aperture, the aperture or opening or hole, the aperture or opening or hole may be of any shape, e.g., circular, triangular, quadrilateral, etc. In some embodiments, the aperture or opening or hole may comprise a ridge, pocket, holder, platform (e.g., a raised platform), etc., such that the external video camera (e.g., a mobile phone) may be positioned in or on the ridge, pocket, holder, platform, etc., for the purpose of taking video or images. The aperture or opening or hole needs to be large enough to fit an external video camera or a lens of an external video camera. In such embodiments of the mirror, light elements being integrated into the apparatus are optional. In some embodiments, an aperture, opening, hole, ridge, holder, pocket (e.g., insertion or placement pocket), platform (e.g., a raised platform), a depressed area, etc., located in the mirror (e.g., the reflective surface of the mirror) may additionally or alternatively be used to hold makeup or cosmetic products thereby allowing the user easy access to the products. In some embodiments, the dimensions (e.g., height, width, length, etc.) and shape of the aperture, opening, hole, ridge, pocket (e.g., insertion or placement pocket), platform (e.g., a raised platform), a depressed area, etc., located in the mirror (e.g., the reflective surface of the mirror) may be adjustable by a user of the mirror. The depressed area may be located near a center of a mirror body section or outside the mirror body section or near an edge or a corner of a mirror body section.

In some embodiments, a camera stand is provided separately from the apparatus comprising the mirror body. In other embodiments, this camera stand may be integrated into the apparatus comprising the mirror body. The camera stand may be positioned in front of the mirror body (e.g., the reflective front surface of the mirror) or behind the mirror body (e.g., adjacent to the back surface of the mirror body). A camera may be placed on the stand such that the camera is able to capture video of the user in front of the mirror. In some embodiments, the stand may be attachable to and detachable from the mirror or the apparatus comprising the mirror. The stand may be foldable, pullable, stackable, and may be magnetic (such that it attaches to the apparatus comprising the mirror body), etc. The stand may be positioned (e.g., height) such that the camera or a lens of the camera may capture video through a hole or aperture (or ridge, pocket (e.g., insertion or placement pocket), platform (e.g., a raised platform), a depressed area, etc.) in the mirror. In some embodiments, the stand may be extendable up or down, and can fold inwards or outwards (e.g., with respect to the reflective surface of the mirror). The stand may also be broadened or narrowed. In some embodiments, the stand is hidden in the apparatus such that a person standing in front of the apparatus cannot see the stand located behind (and installed in, for example) the apparatus. In some embodiments, an entire mirror section may be a light, a display screen, a touch screen (e.g., with a virtual keyboard on the mirror section), a retaining or storage compartment for retaining or storing a mobile computing device, a video camera, one or more cosmetic products, one or more pieces of jewelry, etc.

Any features described with respect to one embodiments may be applied to or implemented in any other embodiment described herein. Features or elements from different embodiments may be combined to form new embodiments, including those not described herein. The embodiments described herein are described for exemplary purposes only.

In some embodiments, any apparatus described herein can be as a pet-entertainment device. In some embodiments, the apparatus has separate sections (e.g., comprising reflective surfaces, display screens, light elements, etc.) through ore via which a pet can be entertained by a rolling toy being displayed on one or more of the separate sections. In some embodiments, the apparatus may produce squeaky toy sounds, doorbell sounds, ringing sounds, barking sounds, other animal sounds, etc. In some embodiments, the apparatus may be used (e.g., the display screen, video camera, and computing device integrated into the apparatus) as conference device with your pet (e.g., dog). In some embodiments, the apparatus may display media content for a pet on the display screen. In some embodiments, the apparatus may be of an appropriate shape (e.g., O-shaped) to entertain a pet.

In some embodiments, the mirror's reflective surface may also function as a display screen. The surface may provide both reflective functions and display screen functions at the same time. Alternatively, the surface may be able to provide only one function (e.g., either reflective function of showing a user's reflective or display screen function showing live or recorded media or showing a video (e.g., live video) capture of the user) at a particular time. When used as a display screen, the display screen may be connected (e.g., wired or wireless) to a computing device (either located in or outside the apparatus) and may be able to display movies, live performances, news feed, remote user with whom a video conference is being conducted, etc. Various parts of the display screen may display more than one of the previous list simultaneously. The same screen may be able to display video of both the user being captured by a video camera of the apparatus and remote user (e.g., using another mirror or using another computing device with a video camera) with whom a video conference or chat is being conducted. In some embodiments, different mirror body sections may have display screen capability such that each mirror body section may be able to display different video. The display screen may be located in any part of the apparatus (e.g., any surface including back, front, sides, top, bottom, etc.).

In some embodiments, a user may use the video camera capabilities of the apparatus to conduct a video conference with remote computing device users (including other persons, non-humans, computers, animals such as pets, etc.).

In some embodiments, the apparatus may be used as a projector for projecting a user's image (e.g., the user's image on the reflective surface of a mirror body section) onto an external surface. In some embodiments, other media or live streaming or video associated with a video conference participant may be projected onto the external surface using the projector installed in the apparatus. In some embodiments, the projector may be used to project external media onto a display screen located in the apparatus. The projector may be located in any part of the apparatus. The projector may project images or media obtained from any surface of the apparatus (e.g., front, back, sides, top, bottom, etc.). In some embodiments, the project may project live or non-live video or images simultaneously.

In some embodiments, the apparatus may allow or enable live streaming (e.g., doing your makeup, doing your hair, talking to a friend, talking on the phone, chatting with someone in the room, watching the display screen on the mirror, reciting news, telling your followers or friends something, etc.) of activity occurring in front of the mirror (e.g., the reflective surface of the mirror). In some embodiments, the apparatus may allow anyone or anything in front of the mirror's reflective surface to be live-streamed or recorded. Recordings may be directly saved to the apparatus (e.g., internal hard-drive in the apparatus) or external hard-drive, or may be shared with or sent to other computing devices (e.g., which comprise hard drives). In some embodiments, the video may be live-streamed via a cellular or WiFi or other network connection. The live stream may be provided to social media followers or other types of media or non-media outlets. In some embodiments, the apparatus may comprise a computing device and display screen such that the apparatus may be associated with the user's social media account.

In some embodiments, a social network may be formed with multiple users of the apparatus described herein (i.e., each user has access to owns their own apparatus). The apparatus may be associated with a social media app such that users of the apparatus can communicate with other users of the apparatus. The communication may occur through video conferencing capability built into the apparatus. Alternatively, the communication may be passive such that users are able to add each other as connections or friends and are able to communicate with each other (e.g., via likes or other pre-configured communications, etc.). Users may be able to join communities and interact with other users who share similar interests or put the apparatus to similar uses. In some embodiments, the communication occurs via a network. In some embodiments when the apparatuses are in close proximity, the apparatuses may be able to communicate with each other via short range wireless communication mechanisms (e.g., Bluetooth). In some embodiments, a video conference or chat sessions may be conducted among more than two apparatuses (e.g., users of the apparatuses). In some embodiments, users of other apparatuses (e.g., mobile devices or the like) may be able to video conference or otherwise connect with users of the apparatuses.

In some embodiments, a video conference may be conducted using the video camera integrated into or connected to or positioned in the apparatus. The user of the apparatus may view the user's own image (e.g., video) on a reflective surface of one or more of the mirror body sections, or a display screen installed or present on at least a portion of a mirror body section (and the rest of the portion of the mirror body section being a reflective mirror surface). In some embodiments, the display screen may, additionally or alternatively, be a display screen projector. In some embodiments, the entire mirror body section may be or comprise a display screen for displaying media such as photos, videos, and/or text, including live-streaming video, or recorded video.

In some embodiments, the video camera (either integrated video camera or external video camera (e.g., mobile phone or dedicated video camera) positionable in an aperture or other area (e.g., depressed area, pocket, compartment, etc.) associated with the apparatus) may be used to stream live lessons for makeup or other sessions or lessons (e.g., makeup lessons, makeup tutorials, facial lessons, eyebrow lessons, speech lessons, information, news etc.). There may be one or more video cameras (e.g., two, three, four, five, etc.) in the apparatus, each focusing on a different view in the vicinity of the apparatus. In some embodiments, one or more of the video may be rotatable, tiltable, etc., manually by a user or automatically in response to detecting a trigger event (e.g., movement in a vicinity of the apparatus). In some embodiments, video or photos may be captured of activity or subjects located anywhere around the apparatus (e.g., in front of the mirror body's front reflective surface, behind the apparatus, sides of the apparatus, below or above the apparatus, etc.).

In some embodiments, a user may be able to simultaneously view themselves on the display screen, view media content on the display screen, and view a person with whom the user is conducting a video conference. The three different videos may be viewed on the same mirror body section or on different mirror body sections.

In some embodiments, an aperture (also referred to as a hole, in some embodiments) may be present in a surface of a mirror body section. The mirror body section may be a section with a reflective front surface or an opaque front surface (e.g., a base surface). In some embodiments, the aperture extends from the front surface (e.g., the reflective surface) to the back surface. In other embodiments, the aperture does not penetrate the entire mirror body section and only extends partially into a surface of the mirror body section (e.g., a front surface of the mirror body section). In some embodiments, the aperture may be circular, elliptical, square, rectangular, etc. In other embodiments, the aperture may have any shape or size. In some embodiments, a video camera, camera, or lens may be placed in the aperture and may capture video, photos, etc., including live streaming. In some embodiments, a video camera or camera (or mobile device such as a mobile phone) may be positioned on a stand located behind the apparatus (i.e., adjacent to the back surface of the apparatus) such that the video camera or camera can capture video or image through the aperture. In such embodiments, the aperture may extend from the front reflective surface to the back surface. In some embodiments, other devices, objects (including non-electronic objects), or attachment elements can be attached to or located in the aperture. In some embodiments, the apparatus includes a voice transcription system for listening to a user's words and sending a message including the user's words to a user's desired destination or for storage in a cloud storage. In some embodiments, art or décor may be stored or attached to the aperture. In some embodiments where nothing is present in the aperture, a user can look through the aperture and see activity, people, etc. behind the mirror body (e.g., adjacent to the back surface of the mirror body).

In some embodiments, portions of the apparatus (e.g., light elements, display screens, video capture initiation using integrated video camera, etc.) may turn on or off from motion detection in the vicinity of the apparatus. The motion may be not limited to motion of humans, dogs, birds, etc. In some embodiments, the motion may be limited to particular living beings, e.g., humans and not dogs or birds. In some embodiments, a portion of the apparatus may be activated or deactivated by other non-movement activity. For example, the portion of the apparatus may be activated or deactivated by the color, intensity, brightness, etc., of the ambient light detected by the apparatus (e.g., a light detector comprised in the apparatus). As a further example, the portion of the apparatus may be activated or deactivated by vibrations of a pet, sounds (e.g., a dog's bark), sound of a door opening in the vicinity of the apparatus, the shutting or opening a door or window of a motor vehicle, honk of a car's horn, other vibrations in the vicinity of the apparatus, etc.

In some embodiments, a medical or dental apparatus is provided. The medical apparatus may be an elongated instrument. The elongated instrument may be inserted into the mouth, ear, nose, anus, vagina, penis, rectum, eye, skin incision, or any other opening of the human or animal body. In some embodiments the medical apparatus may comprise one or more mirrors (i.e., reflective surfaces). In some embodiments, the medical apparatus may comprise at least two mirror which are located at an acute angle, substantially right angle, or obtuse angle with respect to each other. In some embodiments, the medical apparatus does not comprise any mirrors. In some embodiments, the elongated instrument may comprise a light element. The light element may be located at the tip of the instrument or around the tip of the instrument, etc. In some embodiments, the entire elongated instrument may comprise a light element. The elongated instrument may be used for checking tonsils, colonoscopy, etc. In some embodiments, the medical or dental apparatus may not be elongated. In some embodiments, the light element may be used to illuminate an interior portion of the human body (e.g., between teeth, under tongue, etc.). In some embodiments, the light element may emit a particular type of light (e.g., ultraviolet light) that has germicidal properties. In some embodiments, the top of the instrument may have an element to activate or deactivate the light element. The medical or dental instrument described herein may be used in surgery, checking, or cleaning any internal organ of a human or animal body. In some embodiments, the medical or dental instrument comprises at least one of a video camera, a network connection device, and a display screen. The video camera can be used to capture images (e.g., video) and stream them to a local or remote computing apparatus comprising a display screen. In some embodiments, a thermometer may be integrated into the medical or dental instrument. In some embodiments, the medical or dental instrument may be a needle or other surgical instrument. In some embodiments, the light may change color or intensity and be used to clean an organ (e.g., an eye) or detect disease of the organ. In some embodiments, any light element may be a laser light element.

In some embodiments, the medical or dental instrument may instead be a cosmetic instrument or apparatus. The cosmetic instrument or apparatus may be a lipstick holder or case, blush holder or case, eyeshadow brush or case, foundation sponge or brush, powder brush or case, eyeliner brush, lip liner brush, lip gloss case or holder, chapstick case or holder, hairspray holder, etc. In some embodiments, a light and/or a mirror is integrated into the cosmetic instrument similar to the medical or dental instrument. The light element may be located near a tip or around the tip if the instrument or apparatus is elongated. In some embodiments, the light element and/or mirror may be located on a cap associated with the instrument or apparatus or on opposite side (e.g., back) compared to the side from which the cosmetic product is applied (e.g., front). The mirror may located on a side, top, or bottom of the instrument. The light element may be located on top or bottom or side and may project light towards the desired point of application. In some embodiments, a video camera and/or display screen may be integrated into the cosmetic instrument or apparatus.

In some embodiments, the mirror body section comprises, is integrated with, or attached to a display screen. In some embodiments, an entire mirror body section may comprise a display screen. In some embodiments, one or more mirror body sections in the mirror body comprises a display screen and one or more other mirror body sections in the mirror body comprises a mirror. In some embodiments, the display screen may be positioned on any portion of a mirror body section (e.g., left side, right side, top, bottom, entire mirror, one-inch sized screen, etc.). Display screen can display any media included but not limited to Internet media, photos, videos, memories, live media, communications with other people, etc. In some embodiments, the display screen may comprise a touch screen such that the displayed content can be manipulated, selected, etc.

In some embodiments, the apparatus may be used as a makeup organizer. In some embodiments, makeup may be inserted into depressed areas (e.g., makeup compartments) of the mirror. In some embodiments, makeup may be inserted into pockets of the compartments. Shapes/sizes for the depressed areas include but are not limited to brush-sized depressed areas, eyeshadow-sized depressed areas, etc. In some embodiments, makeup may be inserted into compartments located within the mirror, which compartment areas may include but are not limited to side pockets, pull-down compartments, hidden compartments within the mirror etc. In some embodiments, the surface of an opening of the compartment is substantially at the same level as the surface of the mirror body section. In some embodiments, the surface of an opening of the compartment comprises a reflective mirror surface.

In some embodiments, the back of the mirror body may be used as a storage unit for makeup or other small items. Therefore, in some embodiments, the opening may be located on the back of the mirror body. In some embodiments, the opening may, additionally or alternatively, be located on the front, top, or bottom surfaces of the apparatus comprising the mirror body. In some embodiments, the items for storing in the storage unit include, but are not limited to, makeup, makeup brushes, eyeshadows, jewelry storage, storage for other units of makeup, concealer, mirrors, large items, display screens, televisions, computer screens, mobile phone, watches, wearable devices, hats, glasses, etc.

In some embodiments, the mirror body may be expandable such that the mirror may be configured to surround the user (at least partially). For example, a button may be pressed on the mirror body that enables the mirror body that form a semi-circle around the user. In some embodiments, such a mirror may have a slinky or spring-like expansion action. In some embodiments, the mirror body (e.g., a semi or full-O shaped mirror body) may be manually configurable to surround the user. In some embodiments, the mirror body that functions as semi or full-O shaped mirror body may include or be replaced with light elements or display screen.

In some embodiments, the mirror body may have a pullout storage unit or compartment. Alternatively, the pullout storage unit may be pulldown, pull-up, pull to the left or right, or pull up or storage unit. The storage unit may protrude out from the mirror body or, alternatively, the mirror body may protrude out from storage unit. Storage unit may be large enough to contain large amounts of makeup or small enough to hold only eyelashes. For example, the size of the storage unit may range from 1 square/cubic inches to 48 square/cubic inches. In some embodiments, the size of the storage unit may be less than or greater than that range.

In some embodiments, the apparatus comprising the mirror body may comprise detachable storage unit. The storage unit may include but is not limited to being inside the apparatus, protruding outside the apparatus, on the back of the apparatus (e.g., on the opposite surface to the reflective surface), on either side of the reflective surface, etc.). Detachable storage units may be detached from mirror by use of any attachment elements, including velcro, buttons, magnets, clips, harness, glue, force of motion, gravity, etc., including any attachment element described in this disclosure. The size of the detachable unit may be, e.g., less than or equal to 1 cubic inches, between 1 cubic inches and 48 cubic inches, greater than 48 cubic inches, etc. The shape of the detachable unit (e.g., a surface of the detachable unit may be circular, square, rectangular, quadrilateral, elliptical, triangular, conical, cylindrical, etc. In some embodiments, the detachable unit have a hole or aperture in it. The hole or aperture may be used for accessing the interior portion of the detachable unit. The hole or aperture may be used for inserting brushes or other makeup items, inserting hair dryers, flat irons, curling irons, etc. In some embodiments, the aperture or the hole may be of appropriate size for storing or retaining a mobile phone, a tablet, larger devices, additional light elements, additional cameras, candy or chocolate, etc. The additional light elements or additional cameras may used for capturing multi-angled photo or video shoots. The additional light elements may be used for capturing brighter images (e.g., reflective images on the reflective surface of the mirror). The additional light elements or additional cameras may be angled towards left, right, front, back, top, down, etc.

In some embodiments, an interior portion of the apparatus or mirror body may be used as a storage unit. The storage unit may be accessed from either the reflective surface of the mirror body or a back surface (e.g., opaque surface) of the mirror body. The storage unit may be used to store, for example, makeup items, jewelry, an organizer, secret items, technology items, battery storage, light elements or other devices needed for powering the light elements, elements or other devices for activating the screen display, screen unit, mobile phone, tablets, etc. The contents of the storage unit may not be viewable from outside the storage unit.

In some embodiments, the apparatus or mirror body may comprise substantially or partially transparent (or translucent) objects such as storage units, drawers, etc. These transparent objects may be located inside the apparatus or may protrude outside the apparatus. In some embodiments, the mirror body may be transparent or translucent. In some embodiment, the light element may be transparent or translucent. In some embodiments, the apparatus may be used to display a hologram outside or inside the surface area/volume of the apparatus. The apparatus may comprise a hologram-generating system to produce this effect. In some embodiments, the hologram may be generated such that it is viewable on or in in the reflective surface of a mirror body section.

In some embodiments, a drawer for makeup or storage may be integrated into any part of the mirror body. The body of the drawer may extend inward from the surface (e.g., reflective surface, back surface, etc.) of the mirror body or outward from the surface (e.g., reflective surface, back surface, etc.) of the mirror body. In some embodiments, one or more of the mirror body sections may fold onto each other to make a drawer or other storage unit. In some embodiments, the drawer or other storage unit may be used as a stand on which the mirror body can rest such that the mirror can stand on a substantially horizontal flat surface facing a user without a having any other stand or support to any vertical or horizontal surface. In some embodiments, the storage unit or drawer may be located along the top surface of the mirror body. In some embodiments, the storage unit or drawer may be located behind the front surface of the mirror body and near the back surface of the mirror body. The storage unit or drawer may have one or more internal or external surfaces that may be mirrors in themselves or may be transparent (e.g., manufactured with glass) or translucent. In some embodiments, the drawer or storage unit may be detachable from and attachable to (e.g., using any attachment elements described herein) the mirror body. In some embodiments, the drawer or storage unit may not protrude out of a surface (e.g., front, back, sides, top, bottom, etc.) of the mirror body. In some embodiments, the drawer or storage unit may protrude out of a surface (e.g., front, back, sides, top, bottom, etc.) of the mirror body.

In some embodiments, a phone case or retaining area may be integrated into the apparatus. The phone case or retaining area may be integrated into a depressed area on one or more mirror body sections, an area within a display screen, an area within a storage unit of the mirror body, etc. In some embodiments, the phone case or retaining area may be located along or in or near the back surface of the mirror. The phone case or retaining area may be at least one of hidden and exposable, expandable and contractable, etc.

In some embodiments, a spherical object (e.g., a ball, a hexagonal object, an object with twelve surfaces, etc.) with mirror-like reflective surface(s) is provided. The reflective surface(s) are made of material that may not break when the spherical object is bounced against a floor or wall or rolled along a floor. The spherical object may be used for amusement purposes, medical purposes, vanity purposes, etc.

In some embodiments, one or more objects may be stuck to or attachable to a mirror body. The mirror body may comprise stickable elements (or devices) or attachable elements (or devices) that enable the one or more objects to be stuck or attached to the mirror body (e.g., the mirror body section, the light element, the display screen, or any other part of the mirror body or apparatus described herein) using the stickable elements (or devices). Such stickable elements or devices may include sticky tape, glue, velcro, magnets, etc., or any other attachment elements described in this disclosure.

In some embodiments, one or more objects may float in the realm or vicinity of the mirror body. These objects are not in direct contact with the mirror but are still influenced by the mirror. For example, the mirror body can enable an object in the vicinity of the mirror body to float using attraction mechanisms (e.g., magnets or other forms of attractive energy, including wireless power, solar energy, sound energy, etc.). The objects may be suspended in air near (e.g., above, or near either side) of the apparatus comprising the mirror body.

In some embodiments, a toothbrush or other dental apparatus is provided. The toothbrush may comprise a mirror and/or light element such that a user of the toothbrush is able to have a better view of an interior portion of the user's mouth.

In some embodiments, the various sections of the mirror body may fold onto or under each other in any direction. For example, in some embodiments, a first mirror body section may be connected to a second mirror body section and a third mirror body section. The first mirror body section may first fold onto or under the second mirror body section and then that combination may then fold onto or under the third mirror body section. In other embodiments, the first mirror body section may first fold onto or under the third mirror body section and then that combination may then fold onto or under the second mirror body section. There is no limit to how many folded sections can be included in the mirror body. For example, a mirror body have 2, 3, 4, 5, 6, 7, 8, 9, 10, 11, 12, 13, 14, 15, etc., or more, folded sections. In some embodiments, one or more of the mirror body sections may be rollable (e.g., similar to a sheet of paper). Once folded or rolled, the mirror body may be stored. In some embodiments, the mirror body may be unfolded or unrolled to its original state such that one or more (or all) of the mirror sections are adjacent to each other and form a large reflective mirror surface (e.g., wherein continuity of the large reflective mirror surface is broken along points of intersection between the mirror sections). In some embodiments, these breaks are not overly discernible by a user's eye and do not affect a user's experience in front of the mirror body's large reflective surface. In some embodiments, each of the mirror body sections may be of any shape (e.g., square, circular, rectangular, elliptical, etc.). The one or more mirror body sections may be connected to one or more (e.g., two or more) other mirror body sections along at least one of a point, an edge, or a surface shared by both mirror body sections. In its folded or rolled state, the mirror body is smaller (e.g., smaller dimensions such as smaller diameter, height, length, and/or width, etc.) compared to its unfolded or unrolled state. In some embodiments, in its folded or rolled state, the mirror body is larger (e.g., larger dimensions such as smaller diameter, height, length, and/or width, etc.) compared to its unfolded or unrolled state.

In some embodiments, at least one of the mirror body, or the mirror body sections, or other parts of the mirror body or apparatus comprising the mirror body (e.g., light element, display screen, etc.) can be flexible. For example, the glass or other material from which a mirror body section is manufactured may be able to be bent, twisted, turned, etc. In some embodiments, the shape or size of any mirror body section may be adjustable or changeable by a user. For example, a mirror with square or rectangular shaped sections may be changed to circular or elliptical shaped sections.

In some embodiments, any of the apparatuses or mirror bodies described herein may be implemented without having a mirror (or other reflective surface). In some embodiments, the mirror may be replaced with a display screen, a hologram device, a non-electronic screen, a transparent or translucent surface, etc.

In some embodiments, parts (which may be detachable from the apparatus) of the apparatus comprising the mirror body may be retractable or exposable from hidden units located in the apparatus. These apparatus parts include computing devices, display screens, televisions, music players, game-playing devices, etc. The hidden units may be located under any surface of the apparatus (e.g., front reflective surface, back surface, side surfaces, top surface, bottom surface, etc.). The retractable part (e.g., display screen) may be exposed on a surface of the apparatus (e.g., and not protrude outside the apparatus) or may protrude outside the apparatus.

The retractable or exposable part may be located along an entire length or width of a mirror body section or may occupy a small portion of the mirror body section (near or at the center of the mirror body section or near an edge or corner of the mirror body section, etc.).

In some embodiments, an element (e.g., a mechanical and/or electronic system) may be provided to perform any expansion, contraction, retraction, exposing, activation, etc., operations (all or either of why may be referred to as configuration operations) described herein associated with any of the component of the apparatus (e.g., mirror body section, light element, display screen, video camera, etc.). The expansion, contraction, retraction, exposing, activation, etc., may be associated with any of the surfaces of the apparatus (e.g., front reflective surface, back surface, side surfaces, top surface, bottom surface, etc.). In some embodiments, the apparatus may have multiple expansion states, and multiple contraction states. The dimensions, shape, size, of the apparatus in one expansion state may be different from the dimensions, shape, size of the apparatus in a another expansion state or a contraction state.

In some embodiments, any of the operations for expansion, contraction, retraction, exposing, activation, etc., change the state of the apparatus from a first state to a second state. This change of state (i.e., the operations associated with the change of state) may be triggered using any triggering or activation mechanism or element (e.g., button or manual input, touchscreen input, voice activation, time of day/month/year, a particular word or sentence or voice detected by voice activation mechanism (and associated computing system(s)) located in the apparatus, etc.).

In some embodiments, an additional mirror body section be hidden present behind the back surface of a first mirror body section. The additional mirror body section may attached to the first mirror body section via one or more attachment elements, or may be attached to the apparatus without being attached to the first mirror body section. The additional mirror body section may be pulled upwards or downwards and then may be held in place adjacent to the first mirror body section to increase the total reflective surface area. Additionally or alternatively, the additional mirror body section may be turned sideways either before or after pulling the additional mirror section upwards or downwards such that the additional mirror section is located substantially perpendicular (or at an angle) to the first mirror body section. The additional mirror body section may be held in such a position (e.g., one or more mechanical and/or electronic attachment or retaining elements or mechanisms) for using the apparatus. In some embodiments, the additional mirror body section may instead be a display screen or touchscreen or light element.

In some embodiments, mirror body, parts, elements, or body sections may be curved, contoured, etc. For example, the apparatus may have a rainbow-shaped mirror body, a circular mirror body, an oval mirror body, an O-shaped mirror body, etc. Each of these shapes may, alternatively or additionally, be associated with individual mirror sections, light elements, light covers, attachment elements, display screens, storage compartments, etc. In some embodiments, any of the mirror sections can be folded in any direction such that the folding is not limited in a particular direction or to particular surfaces of each of the mirror sections. In some embodiments, the mirror body sections may fold similar to a deck of cards. In some embodiments, one or more of the mirror body sections may be manufactured with bendable material such that one or more of the reflective surfaces are bendable.

In some embodiments, the mirror body, or mirror body sections, may be of shapes including but not limited to quadrilateral, square, rectangular, elliptical, circular, oval, etc. The mirror body may include mirror body sections of two or more different shapes. In some embodiments, each of the mirror body sections may be detachably or non-detachably coupled, connected, or otherwise attached to other mirror body sections using any attachment elements or mechanism described herein. Any curved mirror body may have a complementary or associated curved light element on the top, bottom, side, or back of the curved mirror body.

In some embodiments, the mirror body may comprise a jewelry organizer or compartment. The jewelry organizer or compartment may have a door or window or opening located on a surface of a mirror body section. The storage area of the organizer or compartment may be located in a depressed area in the mirror body such that the opening of the organizer or compartment is at a surface level substantially equivalent or level to the surface level of mirror body or one or more mirror body sections. Alternatively, the organizer or compartment may be pulled out of a surface of the mirror body. The opening of the organizer or compartment may have a reflective mirror surface as well. The jewelry organizer may be used to store jewelry, cosmetics, etc. The compartment may have multiple sub-compartments for various different types of jewelry.

In some embodiments, a cosmetic product (e.g., lip gloss) holder or case may comprise a light element (e.g., a sanitizing light element such as a ultraviolet light element that emits ultraviolet light). The light element may be activated when the cosmetic product (e.g., lip gloss brush) which is separate from or attached to the holder or case is placed back in the holder or case after use. The light element (or the holder or the case) detects that this contact and turns on or activates the sanitizing light for a predetermined period of time. The light element sanitizes the brush and deactivates the light after the predetermined period of time. In some embodiments, the light element stays activated indefinitely. In some embodiments, a power source for the holder or case (e.g., for the sanitizing light element) may be located internal to the holder or case or may be located external to the holder or case. Motion may be detected in embodiments of this disclosure using motion detectors, actuators, transducers, and computing systems using these elements. In some embodiments, the holder or case (e.g., the lip gloss holder or case) may be permanently attached to the product application object (e.g., the lip gloss brush). In such embodiments, the holder or case detects the open state and the closed state of the apparatus comprising the holder or case and the product application object. When the apparatus enters the closed status after being in the open state (e.g., when the user uses the product application object to apply the cosmetic product on the user's face, for example), the light element (or the holder or the case) detects that the apparatus has entered the closed state and turns on or activates the sanitizing light for a predetermined period of time or indefinitely.

In some embodiments, the apparatus may communicate and/or be controlled by with other Internet of Things devices in a home (e.g., phone, speaker, thermostat, doorbell, lights, carbon monoxide detector, front door security camera, security system, clock, tablet, computing systems, television, etc.). In some embodiments, the apparatus may comprise a display screen, a video camera, a control system/operating system for controlling/operating the elements of the apparatus, a processor for executing instructions, a memory for storing instructions and data, an application programming interface for assisting with execution of an application, a light element, an input/output (I/O) unit, a power control system for controlling power being delivered to the light element, a power source (optional), a network communication device (e.g., for establishing short-range or long-range communication) with one or more apparatuses or other computing devices. Embodiments of this disclosure may provide a non-transitory computer-readable medium comprising computer-readable code configured for performing one or more operations or functions described herein. In some embodiments, the apparatus may include a resource allocating system (e.g., in the processor or separate from the processor) for allocating memory and/or power resources among the various components of the apparatus.

The processor may control any of the other units in the apparatus, elements of those units, and/or functions performed by those units. Any actions described herein as being performed by a processor may be taken by the processor alone and/or by the processor in conjunction with one or more additional processors, units, subunits, elements, components, devices, and/or the like. Additionally, while only one processor may be shown in the figures, multiple processors may be present and/or otherwise included in the computing environment (e.g., associated with or included in the apparatus). Thus, while instructions may be described as being executed by the processor (and/or various units of the processor), the instructions may be executed simultaneously, serially, and/or by one or multiple processors in parallel.

In some embodiments, the processor may be implemented as one or more computer processor (CPU) chips and/or graphical processor (GPU) chips and may include a hardware device capable of executing computer instructions. The processor may execute instructions, codes, computer programs, and/or scripts. The instructions, codes, computer programs, and/or scripts may be received from and/or stored in the memory, the I/O unit, the network communication device, sub-units and/or elements of the aforementioned units, other devices and/or computing environments, and/or the like. As described herein, any unit and/or subunit (e.g., element) of the computing environment and/or any other computing environment may be utilized to perform any operation. In some embodiments, the computing environment may not include a generic computing system, but instead may include a customized computing system designed to perform the various methods described herein.

The memory may include random access memory (RAM), read only memory (ROM), and/or various forms of secondary storage. RAM may be used to store volatile data and/or to store instructions that may be executed by the processor. For example, the data stored may be a command, a current operating state or configuration of the apparatus, and/or the like. As a further example, data stored in the memory may include instructions related to various methods and/or functionalities described herein. ROM may be a non-volatile memory device that may have a smaller memory capacity than the memory capacity of a secondary storage. ROM may be used to store instructions and/or signals that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory may include one or more databases for storing any data described herein. Additionally or alternatively, one or more secondary databases located remotely from the computing environment may be utilized and/or accessed by the memory.

In some embodiments, the memory may be utilized for storing, recalling, receiving, transmitting, and/or accessing various instructions or data during operation of the apparatus. The memory may include various types of data storage media such as solid state storage media, hard disk storage media, and/or the like. The memory may include dedicated hardware elements such as hard drives and/or servers, as well as software elements such as cloud-based storage drives. In some embodiments, the memory may include various units such as an operating system unit (which may also be referred to as a control system unit), an application unit, and/or an application programming interface (API) unit.

The operating system unit may facilitate deployment, storage, access, execution, and/or utilization of an operating system utilized by the computing environment (e.g., associated with the apparatus) and/or any other computing environment described herein. In some embodiments, the operating system may include various hardware and/or software elements that serve as a structural framework for enabling the processor to execute various operations described herein. The operating system unit may further store various pieces of information and/or data associated with operation of the operating system and/or the computing environment as a whole, such as a status of computing resources (e.g., processing power, memory availability, resource utilization, and/or the like), runtime information, modules to direct execution of operations described herein, user permissions, security credentials, and/or the like. The computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

The application unit may facilitate deployment, storage, access, execution, and/or utilization of an application utilized by the computing environment (e.g., associated with the apparatus). For example, users may be required to download, access, and/or otherwise utilize a software application on the apparatus or a computing device in communication with the apparatus in order for various operations described herein to be performed. Information included in the application unit may enable a user to execute various operations described herein. The application unit may further store various pieces of information associated with operation of the application and/or the computing environment as a whole, such as a status of computing resources (e.g., processing power, memory availability, resource utilization, and/or the like), runtime information, modules to direct execution of operations described herein, user permissions, security credentials, and/or the like.

The API unit may facilitate deployment, storage, access, execution, and/or utilization of information associated with APIs of the computing environment. For example, computing environment may include one or more APIs for enabling various input systems, computing devices, applications, and/or computing environments to communicate with each other and/or perform operations on data. Accordingly, the API unit may include API databases comprising information that may be accessed and/or utilized by applications and/or operating systems of other devices and/or computing environments. In some embodiments, each API database may be associated with a customized physical circuit included in the memory and/or the API unit.

The I/O unit may facilitate the receipt, transmission, processing, presentation, display, input, and/or output of data as a result of executed processes described herein. In some embodiments, the I/O unit may include a plurality of I/O units. In some embodiments, the I/O unit may include one or more elements of a computing device, a server, and/or a similar device. The I/O unit may include a variety of elements that enable a user to interface with the computing environment. For example, the I/O device may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O unit may include a display, a screen, a projector, a sensor, a vibration mechanism, a light emitting diode (LED), a speaker, a radio frequency identification (RFID) scanner, and/or another element for presenting and/or otherwise outputting data to a user. In some embodiments, the I/O unit may communicate with one or more elements of the processor and/or the memory to execute operations described herein.

The network communication device may facilitate establishment, maintenance, monitoring, and/or termination of communications between the computing environment (e.g., associated with the apparatus) and other devices such as other apparatuses, computing devices, other computing environments, server systems, and/or the like. The network communication device may further enable communication between various elements of the computing environment. In some embodiments, the network communication device may include a network protocol unit, an API gateway, and/or a communication device. The network communication device may include hardware and/or software elements.

The network protocol unit may facilitate establishment, maintenance, and/or termination of a communication connection between the computing environment (e.g., associated with the apparatus) and another device (e.g., associated with another apparatus or another computing device) by way of a network. For example, the network protocol unit may detect and/or define a communication protocol required by a particular network and/or network type. Communication protocols utilized by the network protocol unit may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), and/or the like. In some embodiments, facilitation of communication between the computing environment and any other device, as well as any element internal to the computing environment, may include transforming and/or translating data from being compatible with a first communication protocol to being compatible with a second communication protocol. In some embodiments, the network protocol unit may determine and/or monitor an amount of data traffic to consequently determine which particular network protocol is to be used for transmitting and/or receiving data.

The API gateway may facilitate the enablement of the apparatus, or other devices and/or computing environments, to access the API unit of the memory unit of the computing environment (e.g., associated with the apparatus or other apparatuses or computing devices). For example, a computing device may access the API unit via the API gateway. In some embodiments, the API gateway may be required to validate user credentials associated with a user of a computing device prior to providing access to the API unit to the user. The API gateway may include instructions for enabling the computing environment to communicate with another device.

The communication device may include a variety of hardware and/or software specifically purposed to enable communication between the computing environment and another device, as well as communication between elements of the computing environment. In some embodiments, the communication device may include one or more radio transceivers, chips, analog front end (AFE) units, antennas, digital or analog processors, memory, other logic, and/or other components to implement communication protocols (wired or wireless) and related functionality for facilitating communication between the computing environment and any other device. Additionally and/or alternatively, the communication device may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements be provided according to the structures disclosed herein may be included in integrated circuits of any type to which their use commends them, such as ROMs, RAM (random access memory), DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as digital signal processors (DSP), graphics system processors (GSP), synchronous vector processors (SVP), and image system processors (ISP) all represent sites of application of the principles and structures disclosed herein.

Implementation of any device or unit or element of any apparatus or device described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

In some embodiments, the apparatus may comprise a network communication device or router. In some embodiments, the apparatus may function as a Wi-Fi hotspot such that other computing devices in its vicinity may connect to a network (e.g., the Internet) by connecting to the apparatus. In some embodiments, any features that are described herein with regard to portable/travel mirrors may also be applicable to stationary mirrors. In some embodiments, the apparatus include a system for producing a flash when capturing photos or videos using an embedded or integrated camera or video camera.

In some embodiments, any clasps, clips, or other attachment elements have adjustable characteristics (e.g., length, width, and/or height are adjustable). In some embodiments, a location device (e.g., a global positioning system (GPS) device) may be integrated into the apparatus such that the apparatus' location can be determined. The location may be communicated to a user's other computing devices or to a cloud server. In the event that a user loses his or her apparatus, the user can track down the apparatus by pinging its location. In some embodiments, a live location of the apparatus may be determined from the user's other computing devices. In some embodiments, the apparatus may be integrated into a selfie stick, or the apparatus may comprise a selfie stick. The camera capability described herein may be used by a user to capture a selfie. In some embodiments, an app (e.g., a software application) associated with the apparatus has function to capture a selfie and configure or modify a captured selfie. In some embodiments, the apparatus comprises or is integrated into an ordering system, such as a food ordering system. In some embodiments, a food ordering system is integrated into any motor vehicle (and without being integrated into or part of the apparatus described herein). In some embodiments, a user may find nearby restaurants according to the user's choices (e.g., based on reviews, the user's budget for a meal, the user's preference of cuisine, etc.) by talking to a food ordering system (e.g., an intelligent food ordering system). The ordering system may be used to establish communication with a restaurant or send an order to a restaurant. In some embodiments, a financial transaction may directly be conducted hands-free (e.g., while the user is driving) using the food ordering system. In some embodiments, the ordering system may be controlled or communicated with using a user's voice (in some embodiments, only voices of pre-selected users may be used). In some embodiments, the ordering system may send a transcript of a message comprising the user's food order to the user's desired restaurant. The ordering system may comprise a video camera such that a video conference can be establish with a restaurant to place an order. The ordering system may also have functions and/or elements associated with the apparatus described above or below, such as the apparatus functioning as a security camera/system.

In some embodiments, any apparatus described herein may function as a security camera/system for a motor vehicle. For example, any of the apparatuses described herein (e.g., comprising a mirror and/or light element and/or video camera and/or display screen) may monitor the vicinity of a motor vehicle and may capture audio and/or video when movement is detected (e.g., when the motor vehicle comes into direct contact with people and/or objects such as other motor vehicle) or sound is detected either within or outside the motor vehicle. The apparatus may also capture video (e.g., associated with an external vicinity of the motor vehicle, inside the motor vehicle, etc.) when a user is driving. The apparatus may also capture video in response to certain triggers (e.g., when the motor vehicle is in an accident, when a smart system communicating with the motor vehicle determines when the motor vehicle is about to be in an accident, when the motor vehicle is getting towed, when the motor vehicle is pulled over by the police, etc.).

In some embodiments, a separate power source is provided for each light element in the apparatus. In some embodiments, a single power source is provided for at least two light elements in the apparatus. In some embodiments, a separate power source is provided for a computing device or display screen located in the apparatus. In some embodiments, the same power is used for at least a light element and a computing device or display screen located in the apparatus. In some embodiments, on/off functions (e.g., mechanically and/or electrically-implemented) may be presented for the various elements in the apparatus.

In some embodiments, quick-select options may be used for certain functions. The quick-select options may selected using a touchscreen (e.g., virtual buttons) or using manual buttons or options. The quick-select options may include capturing a photo or video associated with a user located in front of any of the surfaces of the mirror (e.g., the front reflective surface, or other surfaces), and/or transmitting or uploading the photo or video to a particular friend, to a social media/network account, to a cloud server, to the user's other computing devices, etc. In some embodiments, an adjustable or configurable timer may be provided for capturing the photo or video. In some embodiments, a photo booth image capturing functionality may be integrated into the apparatus. When selected, the photo image capturing functionality may capture multiple images of a user (and/or other users) located in front of any of the surfaces of the mirror (e.g., the front reflective surface, or other surfaces).

In some embodiments, a laptop-style mirror is provided. The laptop-style mirror comprises two mirror body sections connected along a shared edge. The laptop-style mirror is foldable similar to a laptop. The laptop-style mirror may have deep or shallow inserts, pockets, compartments, etc., for storing or holding cosmetic or makeup products. The inserts, pockets, or compartments (e.g., depressed areas) may be located around the surface of the mirror. In some embodiments, the inserts, pockets, or compartments may have individual covers. In some embodiments, the inserts, pockets, or compartments may share one or more covers that prevent spillage of the cosmetic product out of the inserts, pockets, or compartments. In some embodiments, one or more of the mirror body sections may have light elements along an edge. In some embodiments, the mirror body section comprising the inserts, pockets, or compartments may have a cover connected to one edge of the mirror body section. The cover may be used to cover the inserts, pockets, and compartments.

In some embodiments, an apparatus is provided comprising: a light element; and a mirror body, comprising one or more mirror body sections, wherein the mirror body or the light element is associated with an expanded state and a contracted state, wherein, in the expanded state, at least a first mirror body section and a second mirror body section of the one or more mirror body sections form at least a partially flat surface, wherein the light element is activatable or activated when the light element or the apparatus is connected to a power source, and wherein the light element is not activatable or not activated when the light element or the apparatus is not connected to the power source, wherein the apparatus is attached, using an attachment element, to an interior portion of the motor vehicle, wherein an angular orientation of the visor apparatus, or the mirror body or the light element, is changeable with reference to the attachment element. In some embodiments, a brightness, intensity, or color of the light element is adjustable. In some embodiments, the visor apparatus is stored in a center console. In some embodiments, an apparatus is provided for use in a motor vehicle. The apparatus comprises a mirror body, comprising one or more mirror body sections, integrated into a dashboard or a central console or a headboard of a motor vehicle, wherein the mirror body is in a hidden state, and wherein the mirror body is exposable from the hidden state, wherein the interior portion of the motor vehicle does not comprise a visor. In some embodiments, the mirror body is exposable from the hidden state using an electronic initiation system or a mechanical initiation system. In some embodiments, a portable apparatus comprises: a mirror body, comprising one or more mirror body sections, attachable, using an attachment element, to a portion of a visor of a motor vehicle, wherein the mirror body is associated with an expanded state and a contracted state, wherein the one or more body sections comprises a first mirror body section and a second mirror body section, wherein the first mirror body section, comprising a first reflective surface, is connected, using a second attachment element, to the second mirror body section comprising a second reflective surface, wherein the first attachment element is different from the second attachment element, wherein the external surface is substantially parallel to the first reflective surface or the second reflective surface; a light element comprised in or on the second mirror body section; and wherein, in the expanded state, the first mirror body section and the second mirror body section form a third reflective surface comprising the first reflective surface and the second reflective surface, wherein continuity of the third reflective surface is broken along an edge of the first mirror body section or the second mirror body section, wherein a first area of the third reflective surface is greater than a second area of the first reflective surface or the second reflective surface, and wherein the mirror body is, in the expanded state, is positionable, using the attachment element, substantially parallel to the first reflective surface or the second reflective surface, without being supported by a second external surface substantially perpendicular to the first reflective surface or the second reflective surface, wherein, in the contracted state, the first mirror body section folds onto the second mirror body section such that at least a first portion of the first mirror body section is substantially parallel to at least a second portion of the second mirror body section, and such that the first reflective surface is facing the second reflective surface, and such that, in the contracted state, the light element, located adjacent to the second mirror body section, or a cover for the light element, is not in physical contact with the first reflective surface, wherein a length of at least one first edge of the mirror body in the expanded state is substantially equivalent to the length of the at least one first edge of the mirror body in the contracted state wherein the light element is activatable or activated when the mirror body is in the expanded state, wherein the light element is activatable or activated when the light element or the mirror body is connected, in the expanded state, to a power source.

In some embodiments, an apparatus is provided comprising: a mirror body, comprising one or more mirror body sections; a storage compartment comprised in the mirror body, wherein an opening to the storage compartment is at substantially a same level as a reflective surface of a mirror body section of the one or more mirror body sections. In some embodiments, the storage compartment comprises a depressed space in the reflective surface of the mirror body section. In some embodiments, the storage area stores a cosmetic product or a jewelry piece. In some embodiments, an apparatus is provided comprising: a mirror body, comprising one or more mirror body sections; a video camera, wherein the video camera captures video associated with activity occurring in front of a reflective surface of a mirror body section of the one or more mirror body sections. In some embodiments, the video is associated with a user's self-application of a cosmetic product.

In some embodiments, an apparatus is provided comprising: a mirror body, comprising one or more mirror body sections; a video camera, wherein the video camera captures video associated with activity occurring in front of a reflective surface of a mirror body section of the one or more mirror body sections. In some embodiments, the video is associated with a user's self-application of a cosmetic product. In some embodiments, the video is associated with a user's self-application of a cosmetic product on a face of the user. In some embodiments, an apparatus is provided comprising a mirror body, comprising one or more mirror body sections; and an aperture in a mirror body section of the one or more mirror body sections, wherein the aperture extends from a reflective front surface to an opaque back surface of the mirror body section. In some embodiments, a video camera is positionable for capturing video through the aperture. In some embodiments, the apparatus further comprises a stand for the video camera. In some embodiments, the video camera is comprised in a mobile phone. In some embodiments, an apparatus is provided comprising a mirror body, comprising one or more mirror body sections; and a computing device comprising a processor; a display screen, wherein the computing device and the display screen enable a video conference to be conducted between a user located in front of a reflective surface of a mirror body section of the one or more mirror body sections and a second user using a second computing device located remotely from the apparatus.

In some embodiments, an apparatus is provided comprising: a mirror body, comprising one or more mirror body sections; and a makeup kit. In some embodiments, an apparatus is provided comprising: a mirror body, comprising one or more mirror body sections; and an object having a first state and a second state, wherein, in the first state, the object is located within a volume of the apparatus, and wherein, in the second state, the object located outside the volume of the apparatus. In some embodiments, the object comprises at least one of a display screen or a light element. In some embodiments, an apparatus is provided comprising: a mirror body, comprising one or more mirror body sections; a video camera; a first display screen for viewing media; and a second display screen for conducting a video conference. In some embodiments, the apparatus is integrated into a seat of a motor vehicle. In some embodiments, the apparatus integrated into a headrest of a motor vehicle. In some embodiments, the apparatus integrated into at least one of the headrest or the seat of a motor vehicle. In some embodiments, an apparatus is provided comprising: a mirror body, comprising one or more mirror body sections; a video camera; a voice transcription and recording system that captures voice associated with a user of the apparatus; a communication system for transmitting a transcription of the voice to a remote system. In some embodiments, an apparatus is provided comprising: a mirror body, comprising one or more mirror body sections; and an emergency call system, wherein a triggering of the emergency call system causes a call to be placed or a message to be sent to an emergency service (911).

In some embodiments, a dental apparatus is provided comprising an elongated body comprising a mirror and a light element for insertion into a mouth. In some embodiments, a medical apparatus comprising an elongated body comprising a light element for insertion into a human body. In some embodiments, a medical apparatus is provided comprising an elongated body comprising a mirror and a light element for insertion into a human body. In some embodiments, a toothbrush comprising a light element. In some embodiments, a toothbrush comprising a mirror and a light element. In some embodiments, a cosmetic apparatus comprises a light element, whereas, in some embodiments, a cosmetic apparatus comprises a mirror and a light element.

In some embodiments, an apparatus is provided comprising: a mirror body, comprising one or more mirror body sections, attachable, using an attachment element, to an object or to a surface, wherein the mirror body is associated with an expanded state and a contracted state; a light element; and a power source for providing power to the light element; wherein the light element is activatable or activated, using the power from the power source, when the mirror body is in the expanded state, wherein at least a first mirror body section and a second mirror body section of the one or more mirror body sections form at least a partially flat surface in the expanded state, wherein at least the first mirror body section folds onto the second mirror body section in the contracted state, wherein a length of a first edge of the mirror body in the expanded state is substantially equivalent to the length of the first edge of the mirror body in the contracted state, and wherein a length of a second edge of the mirror body in the expanded state is greater than the length of the second edge of the mirror body in the contracted state.

In some embodiments, a portable apparatus comprises: a mirror body, comprising one or more mirror body sections, attachable, using an attachment element, to a portion of a visor of a motor vehicle, wherein the mirror body is associated with an expanded state and a contracted state, wherein the one or more body sections comprises a first mirror body section and a second mirror body section, wherein the first mirror body section, comprising a first reflective surface, is connected, using a second attachment element, to the second mirror body section comprising a second reflective surface, wherein the first attachment element is different from the second attachment element, wherein the external surface is substantially parallel to the first reflective surface or the second reflective surface; a light element comprised in or on the second mirror body section; and wherein, in the expanded state, the first mirror body section and the second mirror body section form a third reflective surface comprising the first reflective surface and the second reflective surface, wherein continuity of the third reflective surface is broken along an edge of the first mirror body section or the second mirror body section, wherein a first area of the third reflective surface is greater than a second area of the first reflective surface or the second reflective surface, and wherein the mirror body is, in the expanded state, is positionable, using the attachment element, substantially parallel to the first reflective surface or the second reflective surface, without being supported by a second external surface substantially perpendicular to the first reflective surface or the second reflective surface, wherein, in the contracted state, the first mirror body section folds onto the second mirror body section such that at least a first portion of the first mirror body section is substantially parallel to at least a second portion of the second mirror body section, and such that the first reflective surface is facing the second reflective surface, and such that, in the contracted state, the light element, comprised in or on the second mirror body section, or a cover for the light element, is not in physical contact with the first reflective surface, wherein a length of at least one first edge of the mirror body in the expanded state is substantially equivalent to the length of the at least one first edge of the mirror body in the contracted state, wherein the light element is activatable or activated when the mirror body is in the expanded state, wherein the light element is activatable or activated when the light element or the mirror body is connected, in the expanded state, to a power source.

In some embodiments, the portable apparatus further comprises a closing element for retaining the apparatus in the contracted state. In some embodiments, the portable apparatus further comprises the cover for the light element, and wherein the at least two of the one or more mirror body sections and the cover for the light element form the at least the partially flat surface in the expanded state. In some embodiments, the portable apparatus further comprises a cover for the light element, wherein a perpendicular protrusion of a surface of the cover for the light element from the at least the partially flat surface in the expanded state is less than or equal to one inch. In some embodiments, the portable apparatus further comprises at least one of the one or more mirror body sections rests on the cover of the light elements in the contracted state such that a surface of a first mirror body section is substantially parallel to a surface of a second mirror body section. In some embodiments, the portable apparatus further comprises a connector for connecting the apparatus or the light element to a power source in the motor vehicle. In some embodiments, the portable apparatus further comprises a first mirror body section of the one or more mirror body sections is connected to a second mirror body section of the one or more mirror body sections along a lower edge of the first mirror body section and an upper edge of the second mirror body section. In some embodiments, the portable apparatus further comprises the light element is associated with or comprised in a first mirror body section of the one or more mirror body sections, and wherein a second light element is associated with or comprised in a second mirror body section of the one or more mirror body sections. In some embodiments, the portable apparatus further comprises a switch for activating or deactivating the light element. In some embodiments, the portable apparatus further comprises a brightness or intensity or color modifier for modifying the brightness or intensity or color of the light element, respectively. In some embodiments, the portable apparatus further comprises a lever for expanding or contracting the mirror body, and wherein the lever protrudes from the apparatus. In some embodiments, the portable apparatus further comprises a power source for providing power for activating the light element. In some embodiments, the portable apparatus further comprises the attachment element comprises a clip or a clasp. In some embodiments, the attachment element comprises at least one of a velcro, a suction cup, a spring, or a magnet. In some embodiments, the apparatus or the mirror body is at least partially elliptical, circular, triangular, pentagonal, hexagonal, heptagonal, octagonal, rectangular, or square. In some embodiments, an angular orientation of the apparatus is adjustable after the mirror body is attached, using the attachment element, to the portion of the visor or the rearview mirror body of the motor vehicle. In some embodiments, the light element is not activatable or not activated when the mirror body is in the contracted state.

In some embodiments, an apparatus is provided for use in a motor vehicle, the apparatus comprising: a mirror body, comprising one or more mirror body sections, attachable, using an attachment element, to an interior portion of the motor vehicle, wherein the mirror body is associated with an expanded state and a contracted state; and a light element, wherein, in the expanded state, at least a first mirror body section and a second mirror body section of the one or more mirror body sections form at least a partially flat surface, wherein the light element is activatable or activated when the light element or the apparatus is connected to a power source, wherein, in the contracted state, the first mirror body section at least partially folds onto the second mirror body section, and wherein the light element is not activatable or not activated when the light element or the apparatus is not connected to the power source. In some embodiments, the apparatus further comprises a closing element for retaining the apparatus in the contracted state. In some embodiments, the apparatus is placed in an interior compartment of the motor vehicle. In some embodiments, the apparatus further comprises an element for enabling the mirror body to be placed in the expanded state or the contracted state.

In some embodiments, the apparatus further comprises a mirror body, comprising one or more mirror body sections, attachable, using an attachment element, to an object or to a visor, wherein the mirror body is associated with an expanded state and a contracted state; a light element; and a power source for providing power to the light element; wherein the light element is activatable or activated, using the power from the power source, when the mirror body is in the expanded state, wherein at least a first mirror body section and a second mirror body section of the one or more mirror body sections form at least a partially flat surface in the expanded state, wherein at least the first mirror body section folds onto the second mirror body section in the contracted state, wherein a length of a first edge of the mirror body in the expanded state is substantially equivalent to the length of the first edge of the mirror body in the contracted state, and wherein a length of a second edge of the mirror body in the expanded state is greater than the length of the second edge of the mirror body in the contracted state. In some embodiments, the attachment element comprises a clip or a clasp. In some embodiments, the object comprises a door, and wherein the attachment element comprises an over-the-door clip. In some embodiments, the attachment element comprises a suction cup. In some embodiments, the object comprises a monitor, and wherein the apparatus is substantially parallel with regard to a screen of the monitor. In some embodiments, a length of an edge of the mirror body is less than or equal to twenty inches when the mirror body is in the contracted state.

In some embodiments, light elements may be protrudable from the surface of the mirror body and storable in or under the surface of the mirror body. The protruding light elements may provide a more illuminating light experience. In some embodiments, the mirror body may be a see-through mirror body. In some embodiments, the mirror body may rotate about an axis. As used herein, a motor vehicle may include any motor or non-motor vehicle, including cars, buses, bicycles, scooters, boats, airplanes, jets, etc. In some embodiments, a shape of the apparatus or a mirror body section in the apparatus is not elliptical or circular and has at least two or more edges (e.g., at least three edges, at least four edges, at least five edges, at least six edges, at least seven edges, at least eight edges, etc.). In some embodiments, the outer surface of a mirror body section may also comprise a mirror (and optionally one or more light elements). In such embodiments, the apparatus may function as a mirror in the contracted state as well. In some embodiments, the attachment element may wrap around a supporting surface. In some embodiments, the attachment may not wrap around a supporting surface. In some embodiment, the apparatus may comprise a single mirror body section.

In some embodiments, a horizontal length of an edge of the expanded reflective surface (e.g., the third reflective surface) is greater than a horizontal length of a visor (or rearview mirror body) in a vehicle. In some embodiments, a horizontal length of an edge of the expanded reflective surface (e.g., the third reflective surface) is less than a horizontal length of a visor (or rearview mirror body) in a vehicle. In some embodiments, a horizontal length of an edge of the expanded reflective surface (e.g., the third reflective surface) is substantially equal to a horizontal length of a visor (or rearview mirror body) in a vehicle. In some embodiments, a vertical length of an edge of the expanded reflective surface (e.g., the third reflective surface) is greater than a vertical length of a visor (or rearview mirror body) in a vehicle. In some embodiments, a vertical length of an edge of the expanded reflective surface (e.g., the third reflective surface) is less than a vertical length of a visor (or rearview mirror body) in a vehicle. In some embodiments, a vertical length of an edge of the expanded reflective surface (e.g., the third reflective surface) is substantially equal to a vertical length of a visor (or rearview mirror body) in a vehicle.

In some embodiments, the apparatus may be integrated into or may be attachable to or detachable from a suitcase, travel bag, or other travel accessory (all of which are herein referred to as travel case). In some embodiments, any of the apparatuses described herein can be integrated into a travel case. For example, the apparatus (e.g., the mirror apparatus with light elements) may be stored or retained in a compartment in the travel case and may be exposed using a manual, mechanical, or electronic initiation system. The compartment may comprise soft covers (e.g., see discussion associated with covers described in this disclosure) to shield the apparatus from breakage or cracks or other damage. The covers may be located on either side of the top outer surface and bottom outer surface of the mirror. Additionally or alternatively, the travel case may comprise a makeup kit or a storage area in which makeup or other cosmetic items may be stored. In some embodiments, the mirror apparatus may be exposed such that it is substantially vertical with respect to the ground. The storage area for the makeup or other cosmetic items may be substantially horizontal with respect to the ground. Therefore, the storage area for the makeup and other cosmetic items may be substantially perpendicular to the mirror apparatus when the mirror apparatus is exposed or released or pulled up from the compartment. The storage area may be located in the top portion (e.g., near the edge) when the travel case is stood up (the travel case may be stood up either horizontally or vertically). In some embodiments, the storage area may be detachably attached (e.g., using any of the attachment elements described in this disclosure) to the travel case such that the storage area can function and be useful without being attached to the travel case. In some embodiments, the mirror apparatus is integrated into or detachable attached to the storage area such that when a top cover of the storage area is exposed (e.g., by moving it from a horizontal position to a vertical position), the interior portion of the top cover comprises a mirror apparatus (e.g., with light elements). This travel case makes it easy for a person to do their makeup during travel situations (e.g., in an airport, bathroom, etc.).

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

The invention claimed is:

1. An apparatus comprising: a mirror body, comprising one or more mirror body sections, attachable, using a first attachment element, to a portion of a visor in a motor vehicle, wherein the mirror body is associated with an expanded state and a contracted state, wherein the one or more mirror body sections comprises a first mirror body section and a second mirror body section, wherein the first mirror body section, comprising a first reflective surface, is connected, using a second attachment element, to the second mirror body section comprising a second reflective surface, wherein the first attachment element is different from the second attachment element; a light element comprised in or on the second mirror body section; and a connector; wherein, in the expanded state, the first mirror body section and the second mirror body section form a third reflective surface comprising the first reflective surface and the second reflective surface, wherein continuity of the third reflective surface is broken along an edge of the first mirror body section or the second mirror body section, wherein a first area of the third reflective surface is greater than a second area of the first reflective surface or the second reflective surface, and wherein the mirror body, in the expanded state, is positionable, using the first attachment element, wherein when the mirror body is attached, using the first attachment element, to the portion of the visor in the motor vehicle, the first mirror body section and the second mirror body section do not rest on a surface of the portion of the visor, wherein, in the contracted state, the first mirror body section folds onto the second mirror body section such that the first reflective surface and the second reflective surface face each other and are not in physical contact with each other, and such that, in the contracted state, the light element, comprised in or on the second mirror body section is not in physical contact with the first reflective surface, wherein a length of at least one first edge of the mirror body in the expanded state is substantially equivalent to the length of the at least one first edge of the mirror body in the contracted state, and wherein the light element is activatable or activated when the light element or the mirror body is connected, via the connector, to a power source.

2. The apparatus of claim 1, further comprising an element for retaining the mirror body in the contracted state such that a minor force applied to the apparatus does not cause the mirror body to enter the expanded state.

3. The apparatus of claim 1, further comprising a cover for the light element, and wherein the first reflective surface, the second reflective surface, and the cover for the light element are at a substantially similar surface level.

4. The apparatus of claim 1, further comprising a cover for the light element, wherein a protrusion of a surface of the cover above the third reflective surface is less than or equal to one inch.

5. The apparatus of claim 1, further comprising a second light element comprised in or on the first mirror body section.

6. The apparatus of claim 1, wherein the light element is comprised in or on the second reflective surface.

7. The apparatus of claim 1, wherein the light element is comprised in the second mirror body section outside the second reflective mirror surface.

8. The apparatus of claim 1, further comprising a switch for activating or deactivating the light element.

9. The apparatus of claim 1, further comprising a brightness or intensity or color modifier for modifying the brightness or intensity or color of the light element, respectively.

10. The apparatus of claim 1, further comprising a lever for expanding or contracting the mirror body, and wherein the lever protrudes from the apparatus.

11. The apparatus of claim 1, further comprising a power source for providing power for activating the light element.

12. The apparatus of claim 1, wherein the attachment element comprises a clip or a clasp.

13. The apparatus of claim 1, wherein the attachment element does not wrap around a body of the visor in the motor vehicle.

14. The apparatus of claim 1, wherein the portion of the visor comprises a single edge of the visor in the motor vehicle.

15. The apparatus of claim 1, wherein when the mirror body is attached, using the first attachment element, to the portion of the visor in the motor vehicle, the first mirror body section and the second mirror body section are not in physical contact with the portion of the visor.

16. The apparatus of claim 1, wherein an angular orientation of the first mirror body section or the second mirror body section is adjustable after the mirror body is attached, using the attachment element, to the portion of the visor in the motor vehicle.

17. The apparatus of claim 1, wherein the light element is not activatable or not activated when the mirror body is in the contracted state.

18. An apparatus comprising: a mirror body, comprising one or more mirror body sections, attachable, using a first attachment element, to a first interior portion of a motor vehicle or a second interior portion of the motor vehicle, wherein the second interior portion of the motor vehicle comprises a visor in the motor vehicle, wherein the mirror body is associated with an expanded state and a contracted state, wherein the one or more mirror body sections comprises a first mirror body section and a second mirror body section, wherein the first mirror body section, comprising a first reflective surface, is connected, using a second attachment element, to the second mirror body section comprising a second reflective surface, wherein the first attachment element is different from the second attachment element; a light element comprised in or on the second mirror body section; and a connector; wherein, in the expanded state, the first mirror body section and the second mirror body section form a third reflective surface comprising the first reflective surface and the second reflective surface, wherein continuity of the third reflective surface is broken along an edge of the first mirror body section or the second mirror body section, wherein a first area of the third reflective surface is greater than a second area of the first reflective surface or the second reflective surface, wherein an angular orientation of the first mirror body section or the second mirror body section is adjustable after the mirror body is attached, using the attachment element, to the first interior portion of the motor vehicle or the second interior portion of the motor vehicle, wherein, in the contracted state, the first mirror body section folds onto the second mirror body section such that the first reflective surface and the second reflective surface face each other and are not in physical contact with each other, and such that, in the contracted state, the light element, comprised in or on the second mirror body section is not in physical contact with the first reflective surface, wherein the light element is activatable or activated when the light element or the apparatus is connected, via the connector, to a power source, and wherein the light element is not activatable or not activated when the light element or the apparatus is not connected, via the connector, to the power source.

19. The apparatus of claim 18, wherein the attachment element comprises at least one of a spring, a magnet, or a suction cup.

20. The apparatus of claim 18, further comprising a retaining element for preventing the mirror body from entering the expanded state in response to a minor application of pressure or force on the apparatus.

21. The apparatus of claim 18, further comprising a manual, mechanical, or electronic initiation element for enabling the mirror body to be placed in the expanded state or the contracted state.

22. The apparatus of claim 18, wherein when the mirror body is attached, using the first attachment element, to the first interior portion of a motor vehicle or the second interior portion of the motor vehicle, the first mirror body section or the second mirror body section does not rest on a surface of the first interior portion of the motor vehicle or the second interior portion of the motor vehicle.

23. The apparatus of claim 18, wherein the first interior portion of the motor vehicle comprises at least one of a dashboard, a central console, a rearview mirror body, or a headboard of the motor vehicle.

24. An apparatus comprising: a mirror body, comprising one or more mirror body sections, attachable, using a first attachment element, to a visor or to an object, wherein the mirror body is associated with an expanded state and a contracted state, wherein the one or more mirror body sections comprises a first mirror body section and a second mirror body section, wherein the first mirror body section, comprising a first reflective surface, is connected, using a second attachment element, to the second mirror body section comprising a second reflective surface, wherein the first attachment element is different from the second attachment element; a light element comprised in or on the second mirror body section; and a connector; wherein, in the expanded state, the first mirror body section and the second mirror body section form a third reflective surface comprising the first reflective surface and the second reflective surface, wherein continuity of the third reflective surface is broken along an edge of the first mirror body section or the second mirror body section, wherein a first area of the third reflective surface is greater than a second area of the first reflective surface or the second reflective surface, wherein, in the contracted state, the first mirror body section folds onto the second mirror body section such that the first reflective surface and the second reflective surface face each other and are not in physical contact with each other, and such that, in the contracted state, the light element, comprised in or on the second mirror body section is not in physical contact with the first reflective surface, wherein the light element is activatable or activated when the light element or the apparatus is connected, via the connector, to a power source, and wherein the light element is not activatable or not activated when the light element or the apparatus is not connected, via the connector, to the power source.

25. The apparatus of claim 24, wherein when the mirror body is attached, using the first attachment element, to the object or the visor, the first mirror body section or the second mirror body section is not in physical contact with the object or the visor.

26. The apparatus of claim 24, wherein the object comprises a substantially flat surface, and wherein an angular orientation of the first reflective surface or the second reflective surface is adjustable with respect to the substantially flat surface.

27. The apparatus of claim 24, wherein when the mirror body is attached, using the first attachment element, to the object or the visor, a gap between the first mirror body section or the second mirror body section and the visor or the object is at least greater than 0.25 inches.

28. The apparatus of claim 24, wherein the mirror body, in the expanded state, is positionable, using the first attachment element, without being supported by an external surface located substantially perpendicular to and under the first reflective surface or the second reflective surface.

29. The apparatus of claim 24, wherein an angular orientation of the first mirror body section, the second mirror body section, or the light element is adjustable after the mirror body is attached, using the attachment element, to the visor or to the object.

30. The apparatus of claim 24, wherein a length of an edge of the mirror body is less than or equal to twenty inches when the mirror body is in the contracted state.

* * * * *